United States Patent [19]
Wilkinson et al.

[11] Patent Number: 5,805,915
[45] Date of Patent: *Sep. 8, 1998

[54] SIMIMD ARRAY PROCESSING SYSTEM

[75] Inventors: Paul Amba Wilkinson, Apalachin; James Warren Dieffenderfer, Owego; Peter Michael Kogge, Endicott, all of N.Y.

[73] Assignee: International Business Machines Corporation, Armonk, N.Y.

[*] Notice: The term of this patent shall not extend beyond the expiration date of Pat. No. 5,625,836.

[21] Appl. No.: 883,806

[22] Filed: Jun. 27, 1997

Related U.S. Application Data

[63] Continuation of Ser. No. 558,763, Nov. 15, 1995, abandoned, which is a continuation of Ser. No. 356,039, Dec. 14, 1994, which is a continuation of Ser. No. 274,127, Jul. 12, 1994, abandoned, which is a continuation of Ser. No. 887,718, May 22, 1992.

[51] Int. Cl.$^6$ ............................. G06F 15/16; G06F 15/80
[52] U.S. Cl. ................................. 395/800.2; 395/800.16; 395/800.22
[58] Field of Search ........................... 395/800.01, 800.2, 395/800.16, 800.1, 800.21, 800.22

[56] References Cited

U.S. PATENT DOCUMENTS 3,537,074  10/1970  Stokes et al. ........................... 340/172

(List continued on next page.)

FOREIGN PATENT DOCUMENTS 0132926  2/1985  European Pat. Off. .

(List continued on next page.)

OTHER PUBLICATIONS

T.A. Kriz and M.J. Marple, "Multi–Port Bus Structure With Fast Shared Memory", IBM Technical Disclosure Bulletin, vol. 27, No. 10A, pp. 5579–5580, Mar. 1985.

(List continued on next page.)

*Primary Examiner*—Larry D. Donaghue
*Assistant Examiner*—Walter D. Davis, Jr.
*Attorney, Agent, or Firm*—Lynn L. Augspurger

[57] ABSTRACT

A conventional SIMD processor array architecture's functions are amplified by a SIMIMD architecture where more programmable flexibility would be useful. Decision making in general and specifically classification where decision trees are common, is a problem eased by SIMIMD. A SIMD array processor having a plurality of pickets in SIMIMD mode allows each picket to occasionally execute data-dependent instructions that are different from the instructions in other pickets to greatly improve execution efficiency in decision making areas. Every element in A SIMD array of processors receives a stream of commands from the array controller. Here several mechanisms allow an array machine with individual processing elements, called pickets, to interpret some of the SIMD commands in their own unique way, giving each picket a degree of local autonomy. A resulting capability allows the pickets to execute instructions in a mode called SIMIMD. Another resulting capability boosts the performance of executing floating-point instructions significantly. Yet another capability provides for GROUP-ING of pickets in various useful ways such that a combination of groups can be executing SIMD instructions while others are DOZING. There are other resulting capabilities. The SIMD machine is used alone or as part of multiprocessor parallel array processor computing systems and for parallel array processing with a simplified architecture adaptable to chip implementation in an air-cooled environment. The array provided is an N dimensional array of byte-wide processing units each coupled with an adequate segment of byte-wide memory and control logic. A partitionable section of the array containing several processing units are contained on a silicon chip arranged with "pickets", elements of the processing array, each preferably consisting of combined processing element with a local memory for processing bit parallel bytes of information in a clock cycle.

30 Claims, 7 Drawing Sheets

U.S. PATENT DOCUMENTS

| | | | |
|---|---|---|---|
| 3,544,973 | 12/1970 | Borck et al. | 340/172.5 |
| 3,970,993 | 7/1976 | Finnila | 340/172.5 |
| 4,101,960 | 7/1978 | Stokes et al. | 364/200 |
| 4,107,773 | 8/1978 | Gilbreath et al. | 364/200 |
| 4,270,170 | 5/1981 | Reddaway | 364/200 |
| 4,314,349 | 2/1982 | Batcher | 364/716 |
| 4,338,675 | 7/1982 | Palmer et al. | 364/748 |
| 4,380,046 | 4/1983 | Fung | 364/200 |
| 4,394,726 | 7/1983 | Kohl | 364/200 |
| 4,412,303 | 10/1983 | Barnes et al. | 364/900 |
| 4,435,758 | 3/1984 | Lorie et al. | 364/200 |
| 4,467,422 | 8/1984 | Hunt | 364/200 |
| 4,468,727 | 8/1984 | Carrison | 364/200 |
| 4,498,133 | 2/1985 | Bolton et al. | 364/200 |
| 4,523,273 | 6/1985 | Adams, III et al. | 364/200 |
| 4,598,400 | 7/1986 | Hillis | 370/60 |
| 4,604,695 | 8/1986 | Widen et al. | 364/200 |
| 4,621,339 | 11/1986 | Wagner et al. | 364/200 |
| 4,622,650 | 11/1986 | Kulisch | 364/748 |
| 4,706,191 | 11/1987 | Hamstra et al. | 364/200 |
| 4,720,780 | 1/1988 | Dolecek | 364/200 |
| 4,736,291 | 4/1988 | Jennings et al. | 364/200 |
| 4,739,474 | 4/1988 | Holsztynski | 364/200 |
| 4,739,476 | 4/1988 | Fiduccia | 364/200 |
| 4,748,585 | 5/1988 | Chiarulli | 364/900 |
| 4,763,321 | 8/1988 | Calvignac et al. | 370/94 |
| 4,780,873 | 10/1988 | Mattheyses | 370/94 |
| 4,783,738 | 11/1988 | Li et al. | 364/200 |
| 4,783,782 | 11/1988 | Morton | 371/11 |
| 4,805,091 | 2/1989 | Thiel et al. | 364/200 |
| 4,809,159 | 2/1989 | Sowa | 364/200 |
| 4,809,169 | 2/1989 | Sfarti et al. | 364/200 |
| 4,809,347 | 2/1989 | Nash et al. | 382/49 |
| 4,814,980 | 3/1989 | Peterson et al. | 364/200 |
| 4,825,359 | 4/1989 | Ohkami et al. | 364/200 |
| 4,831,519 | 5/1989 | Morton | 364/200 |
| 4,835,729 | 5/1989 | Morton | 364/200 |
| 4,841,476 | 6/1989 | Mitchell et al. | 364/900 |
| 4,847,755 | 7/1989 | Morrison et al. | 364/200 |
| 4,849,882 | 7/1989 | Aoyama et al. | 364/200 |
| 4,852,048 | 7/1989 | Morton | 364/200 |
| 4,855,903 | 8/1989 | Carleton et al. | 364/200 |
| 4,858,110 | 8/1989 | Miyata | 364/200 |
| 4,860,201 | 8/1989 | Stolfo et al. | 364/200 |
| 4,872,133 | 10/1989 | Leeland | 364/748 |
| 4,873,626 | 10/1989 | Gifford | 364/200 |
| 4,891,787 | 1/1990 | Gifford | 364/900 |
| 4,896,265 | 1/1990 | Fiduccia et al. | 364/200 |
| 4,901,224 | 2/1990 | Ewert | 364/200 |
| 4,903,260 | 2/1990 | Boettle et al. | 370/60 |
| 4,905,143 | 2/1990 | Takahashi et al. | 364/200 |
| 4,907,148 | 3/1990 | Morton | 364/200 |
| 4,910,665 | 3/1990 | Mattheyses et al. | 364/200 |
| 4,916,652 | 4/1990 | Schwarz | 364/748 |
| 4,916,657 | 4/1990 | Morton | 364/900 |
| 4,920,484 | 4/1990 | Ranade | 364/200 |
| 4,922,408 | 5/1990 | Davis et al. | 364/200 |
| 4,925,311 | 5/1990 | Neches et al. | 364/200 |
| 4,933,846 | 6/1990 | Humphrey et al. | 364/200 |
| 4,933,895 | 6/1990 | Grinberg et al. | 364/748 |
| 4,942,516 | 7/1990 | Hyatt | 364/200 |
| 4,942,517 | 7/1990 | Cok | 364/200 |
| 4,943,912 | 7/1990 | Aoyma et al. | 364/200 |
| 4,956,772 | 9/1990 | Neches | 364/200 |
| 4,958,273 | 9/1990 | Anderson et al. | 364/200 |
| 4,964,032 | 10/1990 | Smith | 364/200 |
| 4,967,340 | 10/1990 | Dawes | 364/200 |
| 4,975,834 | 12/1990 | Xu et al. | 364/200 |
| 4,985,832 | 1/1991 | Grondalski | 364/200 |
| 4,992,926 | 2/1991 | Janke et al. | 364/134 |
| 4,992,933 | 2/1991 | Taylor | 364/200 |
| 5,005,120 | 4/1991 | Ruetz | 364/200 |
| 5,006,978 | 4/1991 | Neches | 364/200 |
| 5,008,815 | 4/1991 | Hillis | 364/200 |
| 5,008,882 | 4/1991 | Peterson et al. | 370/94.3 |
| 5,010,477 | 4/1991 | Omoda et al. | 364/200 |
| 5,016,163 | 5/1991 | Jesshope et al. | 364/200 |
| 5,020,059 | 5/1991 | Gorin et al. | 371/11.3 |
| 5,021,945 | 6/1991 | Morrison et al. | 364/200 |
| 5,038,282 | 8/1991 | Gilbert et al. | 364/200 |
| 5,038,386 | 8/1991 | Li | 382/49 |
| 5,041,189 | 8/1991 | Tamitani | 364/200 |
| 5,041,971 | 8/1991 | Carvey et al. | 364/200 |
| 5,045,995 | 9/1991 | Levinthal et al. | 364/200 |
| 5,047,917 | 9/1991 | Athas et al. | 364/200 |
| 5,049,982 | 9/1991 | Lee et al. | 357/81 |
| 5,056,000 | 10/1991 | Chang | 364/200 |
| 5,072,217 | 12/1991 | Georgiou et al. | 340/825.79 |
| 5,113,523 | 5/1992 | Colley et al. | 395/800 |
| 5,121,498 | 6/1992 | Gilbert et al. | 395/700 |
| 5,136,582 | 8/1992 | Firoozmand | 370/85.1 |
| 5,142,540 | 8/1992 | Glasser | 371/40.1 |
| 5,146,608 | 9/1992 | Hillis | 395/800 |
| 5,165,023 | 11/1992 | Gifford | 395/325 |
| 5,170,482 | 12/1992 | Shu et al. | 395/800 |
| 5,170,484 | 12/1992 | Gorodalski | 395/800 |
| 5,173,947 | 12/1992 | Chande et al. | 382/41 |
| 5,175,862 | 12/1992 | Phelps et al. | 395/800 |
| 5,175,865 | 12/1992 | Hillis | 395/800 |
| 5,181,017 | 1/1993 | Frey, Jr. et al. | 340/825.02 |
| 5,187,801 | 2/1993 | Zenios et al. | 395/800 |
| 5,189,665 | 2/1993 | Niehaus et al. | 370/458.1 |
| 5,197,130 | 3/1993 | Chen et al. | 395/325 |
| 5,212,773 | 5/1993 | Hillis | 395/200 |
| 5,212,777 | 5/1993 | Gove et al. | 395/375 |
| 5,218,676 | 6/1993 | Ben-Ayed et al. | 395/200 |
| 5,218,709 | 6/1993 | Fijany et al. | 395/800 |
| 5,230,079 | 7/1993 | Grondalski | 395/800 |
| 5,239,629 | 8/1993 | Miller et al. | 395/325 |
| 5,239,654 | 8/1993 | Ing-Simmons et al. | 395/800 |
| 5,251,097 | 10/1993 | Simmons et al. | 361/687 |
| 5,253,359 | 10/1993 | Spix et al. | 395/575 |
| 5,265,124 | 11/1993 | Staab et al. | 375/3 |
| 5,280,474 | 1/1994 | Nickolls et al. | 370/60 |
| 5,297,260 | 3/1994 | Kametani | 395/325 |
| 5,355,508 | 10/1994 | Kan | 395/800 |
| 5,367,636 | 11/1994 | Colley et al. | 395/200 |

FOREIGN PATENT DOCUMENTS

| | | |
|---|---|---|
| 0208497 | 6/1986 | European Pat. Off. . |
| 208457A2 | 6/1986 | European Pat. Off. . |
| 340668A2 | 4/1989 | European Pat. Off. . |
| 428327A1 | 11/1990 | European Pat. Off. . |
| 429733A2 | 6/1991 | European Pat. Off. . |
| 460599A3 | 12/1991 | European Pat. Off. . |
| 485690A2 | 5/1992 | European Pat. Off. . |
| 493876A2 | 7/1992 | European Pat. Off. . |
| 2223867 | 4/1990 | United Kingdom . |
| 89/09967 | 4/1988 | WIPO . |
| 92/06436 | 4/1992 | WIPO . |

OTHER PUBLICATIONS

H.P. Bakoglu, "Second–Level Shared Cache Implementation For Multiprocessor Computers With A Common Interface For The Second–Level Shared Cache And The Second–Level Private Cache", *IBM Technical Disclosure Bulletin*, vol. 33, No. 11, pp. 362–365, Apr. 1991.

Mansingh et al., "System Level Air Flow Analysis for a Computer System Processing Unit", *Hewlett–Packard Journal*, vol. 41 No. 5, Oct. 1990, pp. 82–87.

Tewksbury et al., "Communication Network Issues and High–Density Interconnects in Large–Scale Distributed Computing Systems", *IEEE Journal on Selected Areas in Communication*, vol. 6 No. 3, Apr. 1988, pp. 587–607.

Boubekeur et al., "Configuring A Wafer–Scale Two–Dimensional Array of Single–Bit Processors", Computer, vol. 2, Issue 4, Apr. 1992, pp. 29–39.

Korpiharju et al., "TUTCA Configurable Logic Cell Array Architecture" IEEE, Sep. 1991, pp. 3–3.1–3.3.4.

C.K. Baru and S.Y.W. Su, "The Architecture of SM3: A Dynamically Partitionable Multicomputer System", IEEE Transactions on Computers, vol. C–35, No. 9, pp. 790–802, Sep. 1986.

S.P. Booth et al., "An Evaluation of the Meiko Computing Surface for HEP Fortran Farming*", Computer Physics Communications 57, pp. 486–491, 1989.

S.P. Booth et al., "Large Scale Applications of Transputers in HEP: The Edinburgh Concurrent Supercomputer Project", Computer Physics Communications 57, pp. 101–107, 1989.

P. Christy, "Software to Support Massively Parallel Computing on the MasPar MP–1", 1990 IEEE, pp. 29–33.

S.R. Colley, "Parallel Solutions to Parallel Problems", Research & Development, pp. 42–45, Nov. 21, 1989.

J.R. Nickolls, "The Design of the MasPar MP–1: A Cost Effective Massively Parallel Computer", 1990 IEEE, pp. 25–28.

J.F. Prins and J.A. Smith, "Parallel Sorting of Large Arrays on the MasPar MP–1*, The 3rd Symposium on the Frontiers of Massively Parallel Computation", pp. 59–64, Oct., 1990.

J.B. Rosenberg and J.D. Becher, "Mapping Massive SIMD Parallelism onto Vector Architectures for Simulation", Software–Practice and Experience, vol. 19(8), pp. 739–756, Aug. 1989.

J.C. Tilton, "Porting an Interative Parallel Region Growing Algorithm from the MPP to the MasPar MP–1", The 3rd Symposium on the Frontiers of Massively Parallel Computation, pp. 170–173, Oct., 1990.

"Sequent Computer Systems Balance and Symmetry Series", Faulkner Technical Reports, Inc., pp. 1–6, Jan., 1988.

"Symmetry 2000/400 and 2000/700 with the DYNIX/ptx Operation System", Sequent Computer Systems Inc.

"Symmetry 2000 Systems—Foundation for Information Advantage", Sequent Computer Systems Inc.

"Our Customers Have Something That Gives Them an Unfair Advantage", The nCUBE Parallel Software Environment, nCUBE Corporation.

Y.M. Leung, "Parallel Technology Mapping With Identification of Cells for Dynamic Cell Generation", Dissertation, Syracuse University, May 1992.

"The Connection Machine CM–5 Technical Summary", Thinking Machines Corporation, Oct., 1991.

Fineberg et al., "Experimental Analysis of a Mixed–Mode Parallel Architecture Using Bitonic Sequence Sorting", *Journal of Parallel And Distributed Computing*, Mar. 1991, pp. 239–251.

T. Bridges, "The GPA Machine: A Generally Partitionable MSIMD Architecture", The 3rd Symposium on the Frontiers of Massively Parallel Computation, Oct. 1990, pp. 196–203.

Abreu et al., "The APx Accelerator", The 2nd Symposium on the Frontiers of Massively Parallel Computation, Oct. 1988, pp. 413–417.

D.A. Nicole, "Esprit Project 1085 Reconfigurable Transputer Processor Architecture", CONPAR 88 Additional Papers, Sep. 1988, pp. 12–39.

E. DeBenedictis and J.M. del Rosario, "nCUBE Parallel I/O Software", IPCCC '92, 1992 IEEE, pp. 0117–0124.

T.H. Dunigan, "Hypercube Clock Synchronization:. Concurrency: Practice and Experience, vol. 4(3), pp. 257–268, May 1992.

T.H. Dunigan, "Performance of the Intel iPSC/860 and Ncube 6400 hypercubes*", Parallel Computing 17, pp. 1285–1302, 1991.

D.D. Gajski and J.K. Peir, "Essential Issues in Multiprocessor Systems", 1985 IEEE, pp. 9–27, Jun. 1985.

A. Holman, "The Meiko Computing Surface: A Parallel & Scalable Open Systems Platform for Oracle", A Study of a Parallel Database Machine and its Performance—The NCR/Teradata DBC/1012, pp. 96–114.

Baba et al., "A Parallel Object–Oriented Total Architecture: A–NET", Proceedings Supercomputing, Nov. 1990, pp. 276–285.

Mitchell et al., "Architectural Description of a New, Easily Expandable Self–Routing Computer Network Topology", IEEE INFOCOM, Apr. 1989, pp. 981–988.

K. Padmanabhan, "Hierarchical Communication in Cube–Connected Multiprocessors", The 10th International Conference on Distributed Computing Systems, May 1990, pp. 270–277.

Kan et al., "Parallel Processing on the CAP: Cellular Array Processor", *COMPCON* 84, 16 Sep. 1984, pp. 239–244.

Ezzedine et al., "A 16–bit Specialized Processor Design", *Integration The VLSI Journal*, vol. 6 No. 1, May 1988, pp. 101–110.

A. Mudrow, "High Speed Scientific Arithemetic Using a High Performance Sequencer", *Electro*, vol. 6, No. 11, 1986, pp. 1–5.

Li et al., "Polmorphic–Torus Network", IEEE Transactions on Computers, vol. 38, No. 9, Sep. 1989 pp. 1345–1351.

Li et al., "Sparse Matrix Vector Multiplication of Polymorphic–Torus", IBM Technical Disclosure Bulletin, vol. 32, No.3A, Aug. 1989, pp. 233–238.

Li et al., "Parallel Local Operator Engine and Fast P300", IBM Tech. Disc. Bulletin, vol. 32, No. 8B, Jan. 1990, pp. 295–300.

R. Duncan, "A Survey of Parallel Computer Architectures", IEEE, Feb. 90 ' pp. 5–16.

Sener Ilgen & Issac Schers, "Parallel Processing on VLSI Associative Memory", NSF Award #ECS–8404627, pp. 50–53.

H. Stone, "Introduction to Computer Architecture", Science Research Associates, 1975, Ch. 8, pp. 318–374.

R. M. Lea, "WASP: A WSI Associative String Processor" Journal of VLSI Signal Processing, May 1991, No. 4, pp. 271–285.

Lea, R.M., "ASP Modules: Cost–Effective Building–Blocks for Real–Time DSP Systems", Journal of VLSI Signal Processing, vol. 1, No. 1, Aug. 1989, pp. 69–84.

Isaac D. Scherson, et al., "Bit Parallel Arithmetic in a Massively–Parallel Associative Processor", IEEE, Vo. 41, No. 10, Oct. 1992.

Supreet Singh and Jia–Yuan Han, "Systolic arrays", IEEE, Feb. 1991.

H. Richter and G. Raupp, "Control of a Tokamak Fusion Esperiment by a Set of Multitop Parallel Computers", IEEE vol. 39, 1992, pp. 192–197.

Higuchi et al., "IXM2: A Parallel Associative Processor for Semantic Net Processing—Preliminary Evaluation—", IEEE, Jun. 1990, pp. 667–673.

Frison et al., "Designing Specific Systolic Arrays with the API15C Chip", IEEE 1990, xii+808pp., pp. 505–517.

Berg et al., "Instruction Execution Trade–Offs for SIMD vs. MIMD vs. Mixed Mode Parallelism", IEEE Feb. 1991, pp. 301–308.

Raghaven et al., "Fine Grain Parallel Processors and Real–Time Applications: MIMD Controller/SIMD Array", IEEE, May 1990, pp. 324–331.

G. J. Lipovski, "SIMD and MIMD Processing in the Texas Reconfigurable Array Computer", Feb. 1988, pp. 268–271.

R.M. Lea, "ASP: A Cost–effective Parallel Microcomputer", IEEE Oct. 1988, pp. 10–29.

Mark A. Nichols, "Data Management and Control–Flow Constructs in a SIMD/SPMD Parallel Language/Compiler", IEEE, Feb. 1990, pp. 397–406.

Will R. Moore, "VLSI For Artificial Intelligence", Kluwer Academic Publishers, Ch. 4.1.

Mosher et al., "A Software Architecture for Image Processing on a Medium–Grain Parallel Machine", SPIE vol. 1659 Image Processing and Interchange, 1992/279.

*Patent Abstracts of Japan*, vol. 8, No. 105, 17 May 1984, p. 274. App. No. JP–820 125 341 (Tokyo Shibaura Denki KK) 27 Jan. 1984.

W.D. Hillis, "The Connection Machine", The MIT Press, Chapters 1, 3, and 4.

"Joho–syori", vol. 26(3), 1985–3, pp. 213–225, (Japanese).

Jesshope et al., "Design of SIMD microprocessor array", IEE Proceedings, May 1989, pp:197–204.

Alleyne et al., "A Bit–Parallel, Word–Parallel, Massively Parallel Associative Processor for Scientific Computing", IEEE, 1990, pp. 176–185.

Fineberg et al., "Experimental Analysis of Communication/Data–Conditional Aspects of a Mixed–Mode Parallel Architecture via Synthetic Computations", IEEE, Nov. 1990, pp. 637–646.

DeGroot et al, "Image Processing Using the Sprint Multiprocessor", IEEE, 1989, pp. 173–176.

Nudd et al., "An Heterogeneous M–SMID Architecture for Kalman Filter Controlled Processing of Image Sequences", IEEE, 1992, pp. 842–845.

COUNT 0 BYTES = 1

SHIFT BY COUNT

SUB COUNT

SIMIMD ARRAY PROCESSING SYSTEM

This is a continuation of application Ser. No. 08/558,763, filed on Nov. 15, 1995, now abandoned, which is a continuation of application Ser. No. 07/887,718, filed on May 22, 1992, which is a continuation of application Ser. No. 08/274,127, filed on Jul. 12, 1994 now abandoned, which is a continuation of co-pending application Ser. No. 08/356,039, filed on Dec. 14, 1994.

Cross reference to Other Co-Pending Patent Applications

The present application claims priority and is a continuation-in-part of the following related co-pending Patent applications:

U.S. patent application Ser. No. 611,594, filed Nov. 13, 1990, of J. Dieffenderfer et al., entitled "Parallel Associative Processor System"; and U.S. patent application Ser. No. 798,788, filed Nov. 27, 1991, of P. M. Kogge, entitled "Dynamic Multi-Mode Parallel Processor Array Architecture".

Other commonly owned Co-Pending Applications also assigned to the same-assignee as the present application at the time of filing include:

U.S. patent application Ser. No. 07/250,595, filed Sep. 27, 1988, now abandoned in favor of its continuation application Ser. No. 07/519,332, filed May 4, 1990 of James L. Taylor entitled "SIMD Array Processor" (which was originally published as EPO Application Ser. No. 88307855/88-A on May 3, 1989); and U.S. patent application Ser. No. 07/193,990, filed May 13, 1988, now abandoned, of H. Li, entitled "Methods and Circuit for Implementing an Arbitrary Graph on a Polymorphic Mesh"; and U.S. patent application Ser. No. 07/426,140, filed Oct. 24, 1989, now abandoned, of R. Jaffe et al entitled "Two-Dimensional Input/Output Scheme for Massively Parallel SIMD Computers"; and U.S. patent application Ser. No. 07/439,758, filed Nov. 21, 1989, now abandoned, of W. C. Dietrich, Jr. et al entitled "Method and Apparatus for Performing Memory Protection Operations in a Parallel Processor System".

All above referenced co-pending applications and the present application are owned by one and the same assignee, namely, International Business Machines Corporation of Armonk, N.Y.

The descriptions set forth in these co-pending applications are hereby incorporated into the present application by this reference.

FIELD OF THE INVENTION

These invention relate to Computers and computer systems and particularly to arrays of processors and to a mode for operating a a SIMD processing element for executing SIMIMD instructions within the processing element.

GLOSSARY OF TERMS

ALU
ALU is the arithmetic logic unit portion of a processor.
Array
Array refers to an arrangement of elements in one or more dimensions. An array can include an ordered set of data items (array element) which in languages like Fortran are identified by a single name. In other languages such a name of an ordered set of data items refers to an ordered collection or set of data elements, all of which have identical attributes. A program array has dimensions specified, generally by a number or dimension attribute. The declarator of the array may also specify the size of each dimension of the array in some languages. In some languages, an array is an arrangement of elements in a table. In a hardware sense, an array is a collection of structures (functional elements) which are generally identical in a massively parallel architecture. Array elements in data parallel computing are elements which can be assigned operations and when parallel can each independently and in parallel execute the operations required. Generally, arrays may be thought of as grids of processing elements. Sections of the array may be assigned sectional data, so that sectional data can be moved around in a regular grid pattern. However, data can be indexed or assigned to an arbitrary location in an array.
Array Director
An Array Director is a unit programmed as a controller for an array. It performs the function of a master controller for a grouping of functional elements arranged in an array.
Array Processor
There two principal types of array processors-multiple instruction multiple data (MIMD) and single instruction multiple data (SIMD). In a MIMD array processor, each processing element in the array executes its own unique instruction stream with its own data. In a SIMD array processor, each processing element in the array is restricted to the same instruction via a common instruction stream; however, the data associated with each processing element is unique. Our preferred array processor has other characteristics. We call it Advanced Parallel Array Processor, and use the acronym APAP.
Asynchronous
Asynchronous is without a regular time relationship; the execution of a function is unpredictable with respect to the execution of other functions which occur without a regular or predictable time relationship to other function executions. In control situations, a controller will address a location to which control is passed when data is waiting for an idle element being addressed. This permits operations to remain in a sequence while they are out of time coincidence with any event.
BOPS/GOPS
BOPS or GOPS are acronyms having the same meaning—billions of operations per second. See GOPS.
Circuit Switched/Store Forward
These terms refer to two mechanisms for moving data packets through a network of nodes. Store Forward is a mechanism whereby a data packet is received by each intermediate node, stored into its memory, and then forwarded on towards its destination. Circuit Switch is a mechanism whereby an intermediate node is commanded to logically connect its input port to an output port such that data packets can pass directly through the node towards their destination, without entering the intermediate node's memory.
Cluster
A cluster is a station (or functional unit) which consists of a control unit (cluster controller) and the hardware (which may be terminals, functional units, or virtual components) attached to it. Our Cluster includes an array of PMEs sometimes called a Node array. Usually a cluster has 512 PMEs.

Our Entire PME node array consists of a set of clusters, each cluster supported by a cluster controller (CC).
Cluster controller A cluster controller is a device that controls input/output (I/O) operations for more than one device or functional unit connected to it. A cluster controller is usually controlled by a program stored and executed in the unit as it was in the IBM 3601 Finance Communication Controller, but it can be entirely controlled by hardware as it was in the IBM 3272 Control Unit.

Cluster synchronizer

A cluster synchronizer is a functional unit which manages the operations of all or part of a cluster to maintain synchronous operation of the elements so that the functional units maintain a particular time relationship with the execution of a program.

Controller

A controller is a device that directs the transmission of data and instructions over the links of an interconnection network; its operation is controlled by a program executed by a processor to which the controller is connected or by a program executed within the device.

CMOS

CMOS is an acronym for Complementary Metal-Oxide Semiconductor technology. It is commonly used to manufacture dynamic random access memories (DRAMs). NMOS is another technology used to manufacture DRAMS. We prefer CMOS but the technology used to manufacture the APAP is not intended to limit the scope of the semiconductor technology which is employed.

Dotting

Dotting refers to the joining of three or more leads by physically connecting them together. Most backpanel busses share this connection approach. The term relates to OR DOTS of times past but is used here to identify multiple data sources that can be combined onto a bus by a very simple protocol.

Our I/O zipper concept can be used to implement the concept that the port into a node could be driven by the port out of a node or by data coming from the system bus. Conversely, data being put out of a node would be available to both the input to another node and to the system bus. Note that outputting data to both the system bus and another node is not done simultaneously but in different cycles.

Dotting is used in the H-DOT discussions where Two-ported PEs or PMEs or Pickets can be used in arrays of various organizations by taking advantage of dotting. Several topologies are discussed including 2D and 3D Meshes, Base 2 N-cube, Sparse Base 4 N-cube, and Sparse Base 8 N-cube.

DRAM

DRAM is an acronym for dynamic random access memory, the common storage used by computers for main memory. However, the term DRAM can be applied to use as a cache or as a memory which is not the main memory.

FLOATING-POINT

A floating-point number is expressed in two parts. There is a fixed point or fraction part, and an exponent part to some assumed radix or Base. The exponent indicates the actual placement of the decimal point. In the typical floating-point representation a real number 0.0001234 is represented as 0.1234−3, where 0.1234 is the fixed-point part and −3 is the exponent. In this example, the floating-point radix or base is 10, where 10 represents the implicit fixed positive integer base, greater than unity, that is raised to the power explicitly denoted by the exponent in the floating-point representation or represented by the characteristic in the floating-point representation and then multiplied by the fixed-point part to determine the real number represented. Numeric literals can be expressed in floating-point notation as well as real numbers.

FLOPS

This terms refers to floating-point instructions per second. Floating-point operations include ADD, SUB, MPY, DIV and often many others. Floating-point instructions per second parameter is often calculated using the add or multiply instructions and, in general, may be considered to have a 50/50 mix. An operation includes the generation of exponent, fraction and any required fraction normalization. We could address 32 or 48-bit floating-point formats (or longer but we have not counted them in the mix.) A floating-point operation when implemented with fixed point instructions (normal or RISC) requires multiple instructions. Some use a 10 to 1 ratio in figuring performance while some specific studies have shown a ratio of 6.25 more appropriate to use. Various architectures will have different ratios.

Functional unit

A functional unit is an entity of hardware, software, or both, capable of accomplishing a purpose.

Gbytes

Gbytes refers to a billion bytes. Gbytes/s would be a billion bytes per second.

GIGAFLOPS $(10)^{**}9$ floating-point instructions per second.

GOPS and PETAOPS

GOPS or BOPS, have the same meaning—billions of operations per second. PETAOPS means trillions of operations per second, a potential of the current machine. For our APAP machine they are just about the same as BIPs/GIPs meaning billions of instructions per second. In some machines an instruction can cause two or more operations (ie. both an add and multiply) but we don't do that. Alternatively it could take many instructions to do an op. For example we use multiple instructions to perform 64 bit arithmetic. In counting ops however, we did not elect to count log ops. GOPS may be the preferred use to describe performance, but there is no consistency in usage that has been noted. One sees MIPs/MOPs then BIPs/BOPs and MegaFLOPS/GigaFLOPS/TeraFLOPS/PetaFlops.

ISA

ISA means the Instruction Set Architecture.

Link

A link is an element which may be physical or logical. A physical link is the physical connection for joining elements or units, while in computer programming a link is an instruction or address that passes control and parameters between separate portions of the program. In multisystems a link is the connection between two systems which may be specified by program code identifying the link which may be identified by a real or virtual address. Thus generally a link includes the physical medium, any protocol, and associated devices and programming; it is both logical and physical.

MFLOPS

MFLOPS means $(10)**6$ floating-point instructions per second.

MIMD

MIMD is used to refer to a processor array architecture wherein each processor in the array has its own instruction stream, thus Multiple Instruction stream, to execute Multiple Data streams located one per processing element.

Module

A module is a program unit that is discrete and identifiable or a functional unit of hardware designed for use with other components. Also, a collection of PEs contained in a single electronic chip is called a module.

Node

Generally, a node is the junction of links. In a generic array of PEs, one PE can be a node. A node can also contain a collection of PEs called a module. In accordance with our invention a node is formed of an array of PMEs, and we refer to the set of PMEs as a node. Preferably a node is 8 PMEs.

Node array

A collection of modules made up of PMEs is sometimes referred to as a node array, is an array of nodes made up of modules. A node array is usually more than a few PMEs, but the term encompasses a plurality.

PDE

A PDE is a partial differential equation.

PDE relaxation solution process

PDE relaxation solution process is a way to solve a PDE (partial differential equation). Solving PDEs uses most of the super computing compute power in the known universe and can therefore be a good example of the relaxation process. There are many ways to solve the PDE equation and more than one of the numerical methods includes the relaxation process. For example, if a PDE is solved by finite element methods relaxation consumes the bulk of the computing time. Consider an example from the world of heat transfer. Given hot gas inside a chimney and a cold wind outside, how will the temperature gradient within the chimney bricks develop? By considering the bricks as tiny segments and writing an equation that says how heat flows between segments as a function of temperature differences then the heat transfer PDE has been converted into a finite element problem. If we then say all elements except those on the inside and outside are at room temperature while the boundary segments are at the hot gas and cold wind temperature, we have set up the problem to begin relaxation. The computer program then models time by updating the temperature variable in each segment based upon the amount of heat that flows into or out of the segment. It takes many cycles of processing all the segments in the model before the set of temperature variables across the chimney relaxes to represent actual temperature distribution that would occur in the physical chimney. If the objective was to model gas cooling in the chimney then the elements would have to extend to gas equations, and the boundary conditions on the inside would be linked to another finite element model, and the process continues. Note that the heat flow is dependent upon the temperature difference between the segment and its neighbors. It thus uses the inter-PE communication paths to distribute the temperature variables. It is this near neighbor communication pattern or characteristic that makes PDE relation very applicable to parallel computing.

PICKET

This is the element in an array of elements making up an array processor. It consists of: data flow (ALU REGS), memory, control, and the portion of the communication matrix associated with the element. The unit refers to a 1/nth of an array processor made up of parallel processor and memory elements with their control and portion of the array intercommunication mechanism. A picket is a form of processor memory element or PME. Our PME chip design processor logic can implement the picket logic described in related applications or have the logic for the array of processors formed as a node. The term PICKET is similar to the commonly used array term PE for processing element, and is an element of the processing array preferably comprised of a combined processing element and local memory for processing bit parallel bytes of information in a clock cycle. The preferred embodiment consisting of a byte wide data flow processor, 32k bytes or more of memory, primitive controls and ties to communications with other pickets.

The term "picket" comes from Tom Sawyer and his white fence, although it will also be understood functionally that a military picket line analogy fits quite well.

Picket Chip

A picket chip contains a plurality of pickets on a single silicon chip.

Picket Processor system (or Subsystem)

A picket processor is a total system consisting of an array of pickets, a communication network, an I/O system, and a SIMD controller consisting of a microprocessor, a canned routine processor, and a micro-controller that runs the array.

Picket Architecture

The Picket Architecture is the preferred embodiment for the SIMD architecture with features that accommodate several diverse kinds of problems including:
  set associative processing
  parallel numerically intensive processing
  physical array processing similar to images Picket Array A picket array is a collection of pickets arranged in a geometric order, a regular array.

PME or processor memory element

PME is used for a processor memory element. We use the term PME to refer to a single processor, memory and I/O capable system element or unit that forms one of our parallel array processors. A processor memory element is a term which encompasses a picket. A processor memory element is 1/nth of a processor array which comprises a processor, its associated memory, control interface, and a portion of an array communication network mechanism. This element can have a processor memory element with a connectivity of a regular array, as in a picket processor, or as part of a subarray, as in the multi-processor memory element node we have described.

Routing

Routing is the assignment of a physical path by which a message will reach its destination. Routing assignments have a source or origin and a destination. These elements or addresses have a temporary relationship or affinity. Often, message routing is based upon a key which is obtained by reference to a table of assignments. In a network, a destination is any station or network addressable unit addressed as the destination of information transmitted by a path control address that identifies the link. The destination field identifies the destination with a message header destination code.

SIMD

A processor array architecture wherein all processors in the array are commanded from a Single Instruction stream to execute Multiple Data streams located one per processing element.

SIMDMIMD or SIMD/MIMD

SIMDMIMD or SIMD/MIMD is a term referring to a machine that has a dual function that can switch from MIMD to SIMD for a period of time to handle some complex instruction, and thus has two modes. The Thinking Machines, Inc. Connection Machine model CM-2 when placed as a front end or back end of a MIMD machine permitted programmers to operate different modes for execution of different parts of a problem, referred to sometimes a dual modes. These machines have existed since Illiac and have employed a bus that interconnects the master CPU with other processors. The master control processor would have the capability of interrupting the processing of other CPUs. The other CPUs could run independent program code. During an interruption, some provision must be made for checkpointing (closing and saving current status of the controlled processors).

SIMIMD

SIMIMD is a processor array architecture wherein all processors in the array are commanded from a Single Instruction stream, to execute Multiple Data streams located one per processing element. Within this construct, data dependent operations within each picket that mimic instruction execution are controlled by the SIMD instruction stream.

This is a Single Instruction Stream machine with the ability to sequence Multiple Instruction streams (one per Picket) using the SIMD instruction stream and operate on Multiple Data Streams (one per Picket). SIMIMD can be executed by a processor memory element system.

SISD

SISD is an acronym for Single Instruction Single Data.

Swapping

Swapping interchanges the data content of a storage area with that of another area of storage.

Synchronous Operation

Synchronous operation in a MIMD machine is a mode of operation in which each action is related to an event (usually a clock); it can be a specified event that occurs regularly in a program sequence. An operation is dispatched to a number of PEs who then go off to independently perform the function. Control is not returned to the controller until the operation is completed.

If the request is to an array of functional units, the request is generated by a controller to elements in the array which must complete their operation before control is returned to the controller.

TERAFLOPS

TERAFLOPS means (10)**12 floating-point instructions per second.

VLSI

VLSI is an acronym for very large scale integration (as applied to integrated circuits).

Zipper

A zipper is a new function provided. It allows for links to be made from devices which are external to the normal interconnection of an array configuration.

BACKGROUND OF THE INVENTION

In the never ending quest for faster computers, engineers are linking hundreds, and even thousands of low cost microprocessors together in parallel to create super supercomputers that divide in order to conquer complex problems that stump today's machines. Such machines are called massively parallel. We have created a new way to create massively parallel systems. The many improvements which we have made should be considered against the background of many works of others. A summary of the field has been made in other applications which are referenced. See in this connection the related application for our Parallel Associative Processor System, U.S. patent application Ser. No. 601,594 and our Advanced Parallel Array Processor (APAP). System tradeoffs are required to pick the architecture which best suits a particular application but no single solution has been satisfactory. Our ideas make it easier to provide a solution.

SIMD (Single Instruction Steam, Multiple data streams) is a mode of operation for a parallel array of data processing elements with a single instruction stream that controls all of the elements. This architecture works very well on most problems where there is significant repetition in the data and its processing. There are, however, sections of problems where more program flexibility would be useful. Decision making is one type of problem where program flexibility for problem sections will be useful. Specifically, classification where decision trees are common is one of these problem types. In the referenced co-pending application entitled "Parallel Associative Processor System," we introduced the concept of a "picket" or PME, a PE with a significant amount of memory, and we will elaborate that development here as illustrating the preferred embodiment of our invention.

The picket concept is especially applicable to array processors which can execute SIMD instructions, in which a plurality of processors are manufactured on a single chip to form a powerful array which integrates traditional data stream (ALU and REGS), memory, control logic and interconnections. The described system enables a sub-system controller to make use of independent pickets operating in a SIMD mode.

In addressing a way to accommodate some remaining problem areas related to decision making, we recognize a further area that should be addressed. In making these capabilities available a simple machine, which can be manufactured at lower cost, has been elaborated. However, the concepts of simplicity can be replicated for massively parallel arrays, and the simple machines can and should accommodate placement as modules in a larger system.

SIMD machines have existed for many years. In co-pending applications we have discussed the development of the art and have elaborated upon that art. Rather than elaborate upon art already discussed in related applications, the reader is referred to the co-pending applications for additional references. From this overview it will be seen that from early developments, the art has become increasingly complex, with machines made larger and larger.

The variety and complexity of the systems can be illustrated with the examples below.

U.S. Pat. No. 4,706,191 of Hamstra, entitled "Local Store for Scientific Vector Processor," describes an implementation of a local store memory in a scientific vector processor. U.S. Pat. No. 4,720,780 of Dolecek, entitled "Memory-linked Wavefront Array Processor," describes a systolic array processor using fully capable SISD processors linked on their edges with blocks of memory for pipelined or systolic processing where processing is complex and there is a desire for identifiable and immediate results. The systems of U.S. Pat. No. 4,720,780 and U.S. Pat. No. 4,706,191 do not have the capability of execution of instructions within a SIMD processing element of an array of processors.

U.S. Pat. No. 4,412,303 of Barnes, entitled "Array Processor Architecture," illustrates how thinking in the art developed after over a decade of apparent progress. As large array processors were developed, they became tightly coupled processors whose interconnection and controls were designed to execute problems common to either MIMD array architecture or SIMD array architecture. The SIMD architecture became quite complex, a long way from the simple facilities we have provided for executing instructions within a picket. U.S. Pat. No. 4,412,303 describes an array of FORTRAN processors which have memory modules interconnected with an Omega network. A single control/ data memory is provided, and a related controller monitors the array; however, program and data information are distributed to separate processors and memory such that each processor has its own copy of the software. Processor array synchronization is accomplished by using an approach of synchronization on a computational envelope. Apparently, all processors are required to wait for each other at a predetermined stopping point in a program. The architecture is intended to allow each processor in an array to execute independently of the other processors and occasionally to share control or data information in a manner common to large multi-processors. The architecture also allows the processors to execute the same software on an array of data in a manner that gives the effect of a SIMD architecture. In this mode, the array of processors are synchronized before they are required to share data with other processors or neighbors.

The complex development of the art may be further illustrated by the busing hierarchy and memory architecture of a parallel processor intended to be capable of operating in SIMD or MIMD mode, with a control structure for managing hierarchial busing and control illustrated by U.S. Pat. No. 4,873,626 of Gifford, entitled "Parallel Processing System with Processor Array having Memory System included in System Memory," and U.S. Pat. No. 4,891,787 also of Gifford, entitled "Parallel Processing System with Processor Array having SIMD/MIMD Instruction Processing," both Patents claiming different aspects of the same system. The U.S. Pat. No. 4,873,626 focuses on the busing hierarchy and memory architecture of a parallel processor capable of operating in SIMD or MIMD mode, and with control structure to manage the hierarchical busing and control structure. The U.S. Pat. No. 4,891,787 describes the processor as having a controlling CPU, a sequencer, I/O units, and an array of Memory/Processing Elements (M/PE) that are arranged in hierarchical groups by the bussing structure. The memory of each M/PE is mapped as a part of the controlling CPU's memory. Each M/PE can execute instructions contained within its own memory, giving it the MIMD capability. While in MIMD mode, the controlling CPU can issue a SIMD instruction to the M/PEs. They respond as if one were taking an interrupt, executing the SIMD instruction, and then resuming the execution of its MIMD instruction stream. When not in MIMD mode, the M/PEs only respond to SIMD commands from the controlling CPU, the input/output unit, another M/PE (presumably of higher stature), or from a sequencer unit. No mention is made as to the complexity of the SIMD instructions. These instructions could be at a subroutine level, in which case the SIMD commands become equivalent to subroutine calls to the M/PE. This is supported by the path that SIMD instructions appear to take to get from the controlling CPU to the M/PEs.

In U.S. Pat. No. 4,891,787 to Gifford, no mention is made of the degree of parallelism in the PEs, but it can be understood that a PE is comparable to a card with a processor chip, some memory, and interfaces to inter-group bus, the group bus, and control as separate elements on a card, with multiple cards interconnected by the bussing structure. The instruction stream control structure is not described. There is no instruction stream controller as we will describe. However, it appears that the Gifford MIMD array simulates SIMD operations by restricting the M/PEs to responding to SIMD calls when not in MIMD mode. Our own approach is to provide a SIMD array in a more classical sense, but we provide the system with expanded local autonomous functions that permit a precise string of SIMD commands to step through the execution of unique instructions within each picket.

Illustrating a classical SIMD array processor element is U.S. Pat. No. 4,314,349 of Batcher, entitled "Processing Element for Parallel Array Processors". While this patent relates to an application intended for satellite image processing, it describes in detail a classic bit-serial SIMD array processor, a processor in the sense we refer to as applicable to the tasks which need to be improved. Unlike our own SIMD array processor, but like the classical SIMD elements of such manufacturers as Thinking Machines, Inc., the processor is bit-serial, while ours processes data streams in parallel.

Multi-byte data streams and our concept of picket autonomy provide that each picket in a SIMD array can be expanded and can help solve some remaining problems in decision making.

SUMMARY OF INVENTION

We have recognized that allowing each picket of our SIMD array processor to have picket autonomy will allow each picket to occasionally execute instructions that are different from other instructions in other pickets. This will permit each picket to have a different interpretation of a common command that is sent to all pickets.

Our SIMD array processor uses the concept of picket autonomy to allow each picket to execute different instructions under the control and command of a common SIMD control stream. This gives each picket a degree of independence such that it can work as needed independently to more efficiently solve the problem that doesn't easily organize into arrays and vectors for processing.

As a result, we have achieved an array processor which is capable of processing a multiple data streams but which has the ability for each picket to contain a collection of mechanisms that permit the execution of a variety of processes within the picket by providing interpretation of some SIMD commands within the picket.

Our further development allows each picket to occasionally execute instructions that are different from the instructions in other pickets to accommodate these problem areas.

Our invention also provides a way to address some remaining problem areas related to decision making. We recognize a need for program flexibility for general decision making. Our base architecture works very well on most problems where there is significant repetition in the data and its processing, as can be handled by SIMD with a Single Instruction Stream, and Multiple Data streams in an array of data processing elements with a single instruction stream that controls all of the elements. However, in order to provide an architecture which provides more program flexibility as will be especially useful for decision making in general, and specifically, when classification with decision trees is common, we have provided SIMIMD. With SIMIMD each picket can occasionally execute instructions that are different from instructions in other pickets to satisfy these problem areas.

As a result, we provide an array processor having a SIMIMD mode with the ability to execute instructions within a processing element of an array controlled by an array controller under cycle-by-cycle control of an array controller. Each processing element is capable of executing instructions within the picket in parallel with all other pickets, or in an independent byte parallel serial manner. This provides the computer system with the ability to occasionally execute data-dependent instructions that are different from the instructions contained in other pickets to greatly improve execution efficiency in the decision making areas.

Our SIMIMD array processor will have a construction which provides that every element in the processor array can receive and execute a command from the controller on each clock cycle, some which can be interpreted within each picket to create different operations.

The instruction defined unique function within the PEs can implement the elements of instruction execution. The instructions which can be executed by a picket of an array include ADD, SUB, AND, OR, XOR, NEG, NOP, STORE, and BRANCH ON CONDITION (sign, zero, carry, unconditional).Within a picket instruction execution follows the steps of:

Get Instruction Address,

Instruction Fetch,

Operation Decode,

Instruction pointer update,

Data Fetch,

Instruction Execution, and

Storing of result.

Each picket has an address register which can be loaded from the array controller (a SIMD subsystem controller) or alternatively loaded from data within the picket dataflow under control of a SIMD command from the array controller. Each picket will have a picket operation register which is used in SIMIMD mode to alternatively supply micro-orders to the picket dataflow in SIMIMD mode. As each picket has its own ALU, ALU operation is determined from the picket operation register when so directed by the array controller.

The picket will provide data to a destination register. The destination register is determined from the picket operation register when so directed by the array controller.

As a result of our invention, we have provided the basis for a SIMIMD array processor architecture wherein all processors of an array have data stream and memory elements integrated as processing elements of the array. In the array, all processors can be commanded from a single instruction stream, and they can also execute Multiple Data streams located one per processing elements. Within this construct, data-dependent operations within each picket that mimic instruction execution are controlled by the SIMD instruction stream. The result is a simple and expandable machine where a SIMD machine is provided with the ability to sequence multiple instruction streams (one per picket of the addressed array) using the SIMD instruction stream to operate on Multiple Data Streams (one per picket).

We have created a new way to make massively parallel processors and other computer systems by creating a new "chip" and systems designed with our new concepts. This application is directed to such systems. Our here and in the related applications may be viewed of our expression of the various concepts we teach in this application, and in the related applications. Components described in each application can be combined in our systems to make new systems. They also can be combined with existing technology.

We will elaborate in this and related applications Picket Processors and what we call an Advanced Parallel Array Processor (APAP). It may be interesting to note that the picket processor can employ a PME. A picket processor may be especially useful in military application where a very compact array processor is desirable. In this connection, a picket processor differs somewhat from the preferred embodiment associated with the APAP, our Advanced Parallel Array Processor. However, the commonality exists, and aspects and features which we have provided can be employed in differing machines.

The term picket refers to 1/nth element of an array processor made up of processor and memory and their included communication elements applicable for array intercommunication.

The picket concept is also applicable to the 1/nth of an APAP processing array.

While the picket concept can differ from an APAP in data width, memory size, and number of registers, it is, in the massively parallel embodiment which is an alternative to an APAP, different in that it is configured to have connectivity for 1/nth of a regular array, while a PME in an APAP is a part of a sub-array. Both systems can execute SIMIMD. However, because a picket processor is configured as a SIMD machine with MIMD in the PE, it can directly execute SIMIMD, while a MIMD APAP configuration would execute SIMIMD by using MIMD PEs controlled to emulate SIMD. Both machines use a PME.

Both systems can be configured as a parallel array processor, comprising an array processing unit for the array having 'N' elements interconnected with an array communication network wherein 1/Nth of the processor array is a processing element, it's associated memory, a control bus interface, and a portion of the array communication network.

The parallel array processor has a dual operation mode capability wherein the processing unit can be commanded to operate in either or two modes, and freely move between these two modes for SIMD and MIMD operation, where when SIMD is the mode of its organization a processing unit has the ability to command each element to execute it's own instructions in a SIMIMD mode, and where when MIMD is the implementation mode for the processing units organization it has the ability to synchronize selected elements of the array to simulate MIMD execution. We can call this MIMD-SIMD).

A parallel array processor in both systems provides an array communication network with paths for the passing of information between elements of the array. The movement of information can be direction by either of two ways, where as a first way, an array controller directs that all messages move in the same direction at the same time such that the data being moved does not define its destination, and in a second way, each message is self routed with a a header at the beginning of a message defining its destination.

A segment of the parallel array processor array has plural copies of the processing unit is provided on a single semiconductor chip, which each copy segment segment of the array including a portion of the array communication network associated with that segment and buffers, drivers, multiplexers, and control for enabling the segment portion of the array to be seamlessly connected with other segments of the array to extend the array communication network.

The control bus or path from a controller is provided for each processing unit so that the control bus extends to each of the elements of the array and controls its activities.

Each processing element segment of the parallel array, contains plural copies of a processor memory element, which is contained within the limits of a single semiconductor chip, has a segment of the array includes a portion of the array control bus and the register buffers to support the communication of controls to the array segment contained within the chip.

Both can implement mesh moves or routed moves. Normally, the APAP implements a dual interconnect structure, with eight elements on the chip interrelating in one way, while the chips interrelate in another way. The programmable routing on the chip generally causes links to be established between the PMEs as we have described, but the nodes can be and normally are related in another way. On the chip essentially the normal APAP configuration would be a 2×4 mesh, which the node interconnection can be a routed sparse octal N-cube. Both systems have inter-PE intercommunication pathways between PEs (PMEs) enabling a matrix to be made up of point-to-point paths.

With this background and perspective, we will describe in detail features and aspects of our invention related to the preferred embodiment of our invention with reference to the FIGURES. Then the detailed description will describe aspects of our invention which can be used alone or in combination with the features of related applications.

DESCRIPTION OF THE DRAWINGS

We will describe our preferred embodiment in relation to the accompanying drawings in which:

FIG. 11 describes the steps to do floating-point adjust, while

DETAILED DESCRIPTION OF PARALLEL ARRAY PROCESSOR ENVIRONMENT

Our preferred embodiment is described below beginning with a general discussion of the preferred floating-point embodiment. This embodiment of the floating-point implementation will preferably be used in a parallel array of processing elements (formed as pickets) and can be used in prior art parallel array processors. For that reason, in order to give a better orientation, a discussion of such systems will be appropriate.

Figure 1:
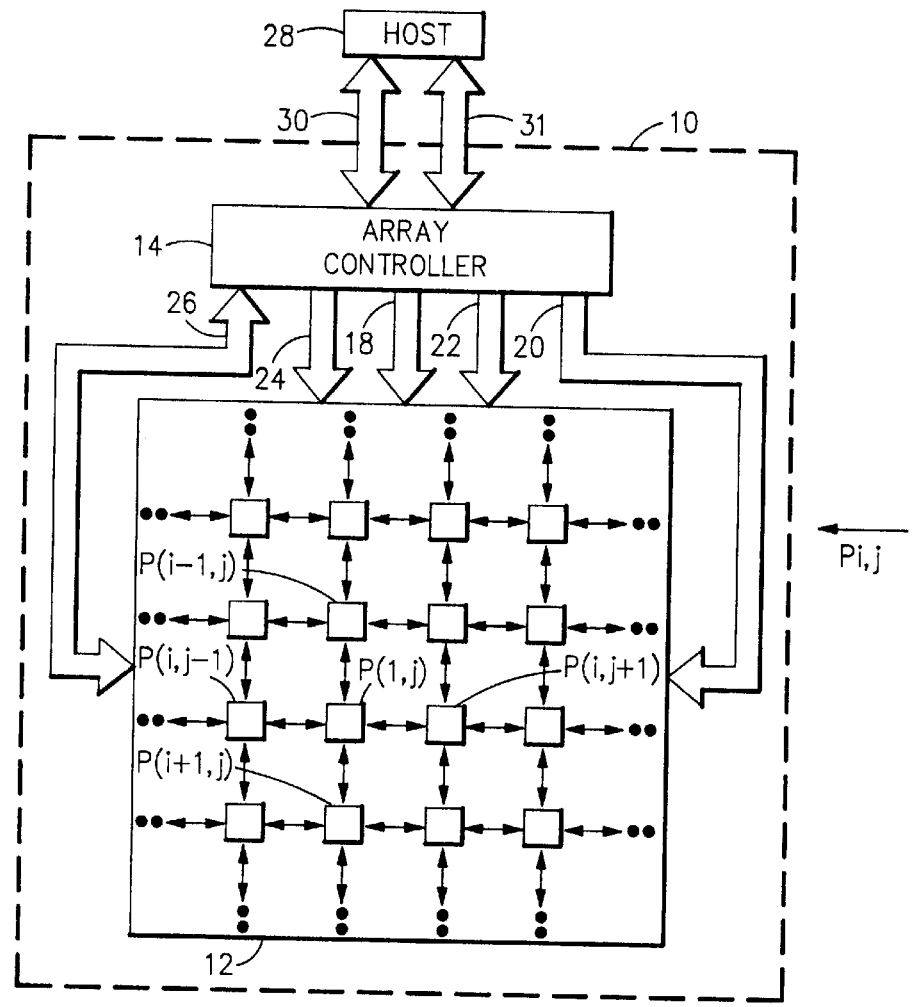
FIG. 1 is a schematic illustration of a SIMD processor of the prior art.

Turning now to the drawings in greater detail, FIG. 1 represents a typical prior art SIMD system of the type generally described in Taylor's IBM European Patent Application No. 88307855/88-A and in UK-A-1,445,714. In such prior art devices, the SIMD computer is a single instruction, multiple data computer having a parallel array processor comprising a plurality of parallel-linked bit-serial processors each being associated with one of a plurality of SIMD memory devices. The input/output I/O system acts as a staging system to the SIMD unit. It has a temporary store for the bidirectional two-dimensional transfer of data between the host computer (which may be a mainframe or a microprocessor) and the SIMD computer. The I/O system includes input/output processing means for controlling the flow of data between the host computer and the temporary storage means and for controlling the flow of data between the temporary store and a plurality of SIMD memory devices which are usually organized buffer sections or partitions of a larger memory. Thus, the input operation of the I/O system involves the transfer of data from the host computer memory to the temporary store and from the temporary store to the SIMD memory devices in the second step. For output, there is also a two step process which transfers across the two dimensional bus the data between the host computer and the SIMD computer. The input/output system for I/O transfer may be a separate unit, a sub-unit in the host, or often a unit within the SIMD computer where the SIMD controller acts as the control for the temporary I/O buffer store.

The SIMD computer itself comprises a processor array having a plurality of processing elements and a network which connects the individual processing elements and a plurality of conventional separate SIMD memory devices. The SIMD computer is a parallel array processor having a great number of individual processing elements linked and operated in parallel. The SIMD computer includes a control unit that generates the instruction stream for the processing elements and also provides the necessary timing signals for the computer. The network which interconnects the various processing elements includes some form of interconnection scheme for the individual processing elements. This interconnection can take on many topologies such as mesh, polymorphic-torus and hypercube. The plurality of memory devices are for the immediate storage of bit data for the individual processing elements. There is a one-to-one correspondence between the number of processing elements and the number of memory devices which can be the buffer partition of a larger memory.

As illustrated in FIG. 1, a SIMD machine has a host processor 28. This processor is used to load microcode programs into the array controller 14 (which includes a temporary store buffer) to exchange data with it and to monitor its status via a host-controller data bus 30 and an address and control bus 31. The host processor in this example could be any suitable general purpose computer such as a mainframe or a personal computer. In this prior art example, the array of processors of the array are illustrated as on a 2-D basis, but the array could be organized differently as on a 3-D or 4-D cluster arrangement. The SIMD array processor comprises an array 12 of processing elements P(i,j), and an array controller 14 for issuing the stream of global instructions to the processing elements P(i,j). While not shown in FIG. 1, the prior example has processing elements which operate on a single bit at one time and a block of associated storage which is a partition in memory associated with the processing element. The processing elements are connected by a NEWS (North, East, West, South) network to their respective neighbors by bidirectional bit lines. Thus, the processing elements P(i,j) is connected to the processing elements P(i−1,j), P(i,j+1), P(i,j−1), and P(i+1,j) in the Northern, Eastern, Western and Southern directions respectively. In this typical example, the NEWS network is toroidally connected at its edges so that the Northern and Southern Edges are bidirectionally interconnected, and the Western and Eastern edges are similarly interconnected. In order that data may be input to and output from the array of processors, a controller-array data bus 26 is connected to the NEWS network. As shown, it is connected to the East-West boundary of the array. It could be connected instead or additionally to the North-South boundary by means of bidirectional tristate drivers which are connected to the toroidal East-West NEWS connection. As in the preferred embodiment which will be described, 1024 processing elements would be achieved by the prior art if the number of processing elements were in this example 32×32 instead of the illustrated 16×16. In the illustration, a single line indicates a single bit line, while a double line connecting functional elements is used to represent a plurality of connection lines or a bus.

In this prior example, the array controller issues instructions in parallel to the processing elements via an instruction bus 18 and issues row select and column select signals via row select lines 20 and column select lines 22, respectively. These instructions cause the processing elements to load data from storage, to process the data and then to store the data once more in storage. For this purpose, each processing element has access to a bit slice (section or buffer) of main memory. Logically, therefore, the main memory of the array processor is separated into 1024 partition slices for a 1024 processing element array. This means that up to thirty-two 32-bit words can be transferred into or out of storage at one time in a transfer step. To perform a read or write operation, the memory is addressed in terms of an index address which is supplied to the memory address lines via an address bus 24 and read or write instruction is supplied to each of the processing elements in parallel. During a read operation, the row and column select signals on the row and column select lines identify which is the processing element that is to perform the operation. Thus, in the described example, it is possible to read a single 32-bit word from memory into the thirty-two processing elements in a selected row when the array is 32×32. The processing element is associated with the slice, or block of memory (i,j) which is one bit wide. While the slice or block memory is logically associated on a one-on-one basis with the associated individual processing element, it may be and typically is physically separated on another chip. We do not know how, with this prior architecture, the described array processor could be manufactured as can our picket be manufactured with an array of processors and adequate memory on a single chip of the kind we describe below.

Processing elements P(i,j) of the prior example themselves should be understood to comprise an ALU, with input and output registers which will include a carry, each of which is able to store a single bit of information. There is a multiplexer which is connected to the ALU input, output and also to the bidirectional data port of the slice of memory (i,j) associated with the individual processing element P(i,j).

There are separate instruction and data buses, and the array controller has a microcode store in which the microcode defining the processing to be performed by the array is loaded by the host 28 using the data bus 30 and the address and control bus 31. Once the operation of the array controller has been initiated by the host 28, the sequencing of the microcode is controlled by the microcode control unit which is connected to the microcode store within the array controller 14. An ALU and register bank of the array controller are used in the generation of array memory addresses, loop counting, jump address calculation and general purpose register operations which are output on an address bus of the array controller. The array controller also has mask registers for decoding row and column mask codes. The specific operation codes pass to the processing elements over an instruction bus. In this example, the array controller could have a data buffer within the controller but functionally between the host controller data bus and the controller array data bus. From this buffer, the data is loaded under control of the microcode in the control store into the array of processors and vice versa. For this purpose, the buffer is arranged as a bidirectional FIFO buffer under control of a microcode control in the array controller. More details of such prior systems may be found by reference to the above cited examples, particularly in Taylor's SIMD Array Processor illustrated by FIG. 1.

Figure 2:
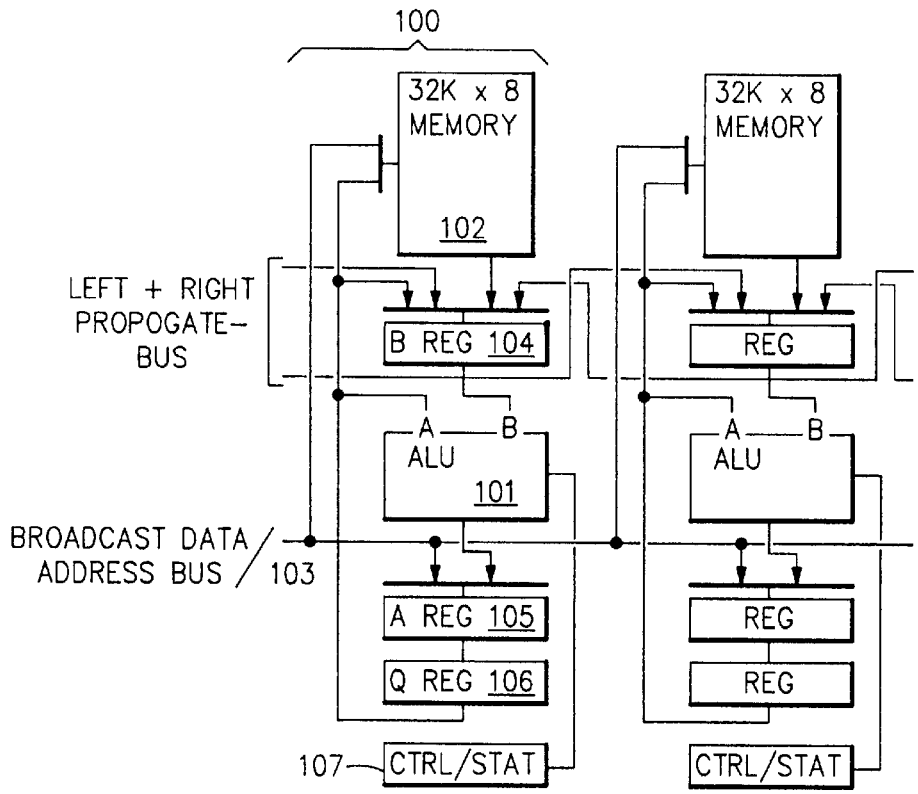
FIG. 2 illustrates a pair of the basic picket units which are configured on a silicon base with processor, memory, control logic and associative memory with byte communication with the other pickets in the array.

A review of the prior attempts may be compared to the preferred embodiments of the invention we describe. FIG. 2 illustrates the basic picket unit 100, comprising a combined processing element ALU 101 with a local memory 102 coupled to the processing element for processing one byte of information in a clock cycle. As illustrated, the picket unit is formed on a silicon base chip or picket chip with a linear array of pickets with neighbors to the side (to the left and right in the figure) such that on a silicon base chip there is formed a picket processing array with a plurality of local memories, one for each of the byte-wide processing data flows arranged in a logical row or in a linear array with neighbor communication buses for passing data bidirectionally to the right and left. The collection of pickets in a picket chip is arranged in a geometric order, preferably horizontally on the chip.

FIG. 2 shows the typical implementation of two pickets of the picket array on a picket chip with multiple memory and dataflow including communication paths between each picket's processing element and memory. In our preferred embodiment, the data communication paths between the one-on-one memory with the processing elements of the array is byte-wide and across, left or right with a neighbor or with a "slide" for communication with picket processors farther away.

A "slide" may be defined as means for transferring information in a single cycle to a non-neighbor position through a picket address location which would normally be able to receive the information were it not transparent to the message being sent until it arrives and is received at the nearest active neighbor actually receiving it. Thus, a slide functions by sending information to a non-neighbor position across "turned off" pickets. Assume that picket "A" wants to transfer information to a remote picket "G". Prior to that cycle, intervening pickets are made transparent by turning these "B" through "F" pickets off. Then, in the next single cycle, "A" sends his message to the right and in doing so passes through "B" through "F" which are transparent because they are turned off. "G" receives the message since it is still turned on. In the normal use of the "slide", information is transferred linearly across the lattice, but the slide approach can also work with a two dimensional mesh or in a multi-dimensional array.

The access of the processing elements in our preferred embodiment is not bit-serial in operation but rather is byte-serial. Each processor has access to its own coupled memory rather than access to a block of local memory and an associated partition or page thereof. Instead of one bit, a character-wide or character-multiples-wide bus is provided. Instead of a bit, a byte (or in future systems envisioned to duplicate the performance of a character byte, multiple bytes) of information is processed in one clock cycle. Thus, 8, 16 or 32 bits may flow between each picket processing element to match the width of the associated memory. In our preferred embodiment, each picket chip has 8 (9) bits wide memory of 32K bytes and preferably 16 pickets with this 32K bytes each of storage per picket node of the linear array. In our preferred embodiment, each associated memory is founded in CMOS as DRAM, and a character byte is 9 bits (which functions as an 8 bit character with self checking).

The parallel path, byte-wide bus, data flow between pickets and between the processing element and its memory is a substantial improvement over the serial bit structure of the prior art systems. It will also be recognized after this important achievement is appreciated that the increased parallelism results in additional problems which will need solution. As one grows into the understanding of the implications of the newly achieved architecture, the other important solutions we will describe will also be appreciated.

A feature which will be appreciated is that, in addition to the left and right neighbor transfers and the slide mechanism which we have described with reference to the drawings, we have provided also a broadcast bus which is double byte-wide, so that all pickets can see the same data at the same time. Picket control and address propagation is also transferred on this broadcast bus. It is this bus that supplies the comparison data when performing set association operations and other comparison or synchronous math operations.

The tasks that have highly parallel data structures that lend themselves to processing within the picket data processing elements under the control of a single instruction stream include applications in artificial intelligence pattern matching, sensor and track fusion in multi-sensor optimal assignment, context searching and image processing. However, many of these applications now possible were not used in SIMD processes because of the serial bit processing under a single clock time. For example, the traditional serial processing element of a SIMD machine executes one bit of an ADD operation for each processor cycle, while a 32 bit parallel machine can execute 32 bits of an ADD in one cycle.

The configuration of 32 KB per processing element applies far more memory logically available to each processing element than the traditional SIMD machine provides.

Pin count on the chip has been held low because the data which is passed into and out of the chip has been kept to a minimum. The DRAM memory is a conventional memory CMOS array and one that supports "row-column" access by deleting the column demultiplexing on the back of the memory array and by providing a row address that reads out a row of the memory array to the data flows in parallel.

The memory, in addition to data, contains "tri-bits" or "trit" so that there are three states recognized by the logic instead of the traditional binary digit, either logic 1, logic 0, or "don't care". The "don't care" in a match field matches either a logic 1 or logic 0. The trit is contained in successive storage locations in the storage array. Masks are another form of data stored in memory that is directed to the mask register of the picket processing element.

As the storage array can contain commands, this allows one picket to do a different operation from another picket. On-chip control of individual pickets during operations involving most pickets, but not necessarily all pickets, allows implementations which are unique for SIMD operations. One simple control function provided is that of suspended operations in any picket whose status output meets a specific condition. Thus, a non-zero condition may mean a doze, a command condition which suspends operations and turns the picket into an inactive but aware status. Another command provided is to inhibit or to enable a write to memory based on conditions in the picket or based upon a command provided to the bus prior to a slide operation.

By applying to a picket chip 16 powerful pickets each with 32 KB memory, only 64 chips provide 1024 processors and memory of 32768 KB. The array of pickets comprises a set associative memory. The invention is useful for numerically intensive processing image analysis as well as vector processing. This powerful picket processing array can be packaged today on only 2 small cards. It will be seen that thousands of pickets can be appropriately packaged in a more portable low power package, enabling image processing applications to be performed with minimal delay or within video frame time, for instance, during the flight of an airborne craft without significant payload consideration.

The power of the pickets leads to the possibility of use of large associated memory systems packed into close quarters and enables the use of the processing power in a variety of applications after the systems designer becomes accustomed to use of the new system.

Figure 3:
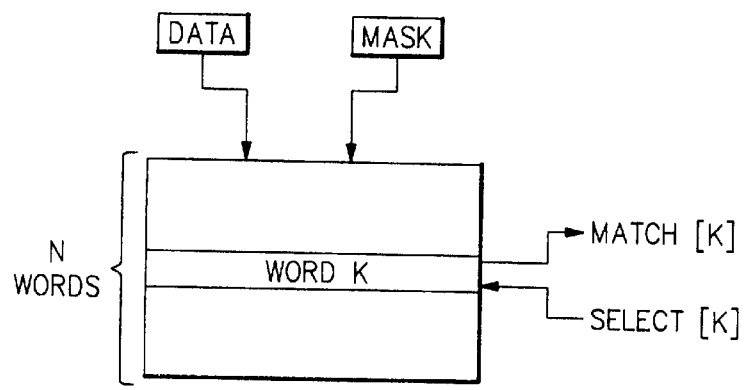
FIG. 3 illustrates associative memory processing.

FIG. 3 illustrates what might be termed fully associative memory in that when an association is requested, a compare value is presented to all memory locations and all memory locations simultaneously respond with their match lines. Associative memory is known by itself in the art. In our system, using parallel pickets of memory and processing elements which have byte transfers in order to perform a search, there is an input of data and a mask for a search in order to locate a word K among N words in memory. All matching pickets raise a status line, and then a separate operation reads or selects the first match K. This operation, commonly called set associative, can be repeated for successive words up through the picket memory. Similarly, writing is achieved via a broadcast operation in which a raised select line indicates participation, and broadcast data is copied to all selected pickets.

Another embodiment, although not the preferred one, reduces the amount of DRAM memory available for each picket to allow inclusion of a section of fully associative memory of the type portrayed in FIG. 3. If, for example, 512 bytes of fully associative memory were included, then every picket could contain a set of search indexes and in a single operation, 512 times 1024 pickets yields 512k compares per operation or 512 Gig-compares per second at one microsecond per operation. With extensibility, the concept can be advanced into the multiple Tera-compare range. This embodiment empowers associative tasks that involve extensive searching for information with capabilities well in excess of computing capabilities available today.

When an association operation uses memory and byte wide coupled processing elements, as illustrated in FIG. 2, in addition to the applications of distinct algorithms or operations, artificial intelligence, and parallel programming attempted in SIMD situations, there are many additional applications now available for the machine with the configuration of the chip we describe in a SIMD environment. These include:

simple parallelizable arithmetic tasks, including matrix multiply and other tasks which can be performed in specialized memory machines;

image matching, and image processing tasks which can be performed in Von Neumann machines but which can be speeded up considerably with the applications adaptable to the extreme parallelism, for instance pattern matching of a three dimensional image;

data based query functions;

dattern matching in the Artificial Intelligence arena;

network control in bridges to rapidly identify messages that go to a user on the other side of a bridge of a network;

gate level simulation; and checkers for VLSI ground rules violations.

Process tasks which take advantage of the bank of memories and associated processing elements will occur to application programmers as they develop applications which take advantage of the power of the new system architecture.

In taking advantage of our new system architecture, process changes will enhance the usual application. A process of keeping a description of a digital system can be enhanced by the use of the array to describe one gate or logic element per picket 100. In such a system, the process would begin by assigning each gate description as a list of signals that the gate accepts as inputs and naming the signal it generates. We would include a step which requires that each time a signal changes, its name is broadcast on bus 103 to all pickets and this name is compared in parallel with the names of expected input signals. If a match is found, a subsequent step records in the picket a new value of the signal in a dataflow register bit. When all signal changes have been recorded, such an enhanced process would cause all pickets to read out in parallel a control word which tells their data flow how to use the current set of inputs to compute the output. The process would then cause these computations to be performed in parallel, with the results compared with the old value from the local gate. Subsequently the improved process should record as a dataflow status bit all of those gates of the pickets whose outputs change. Then, the process would cause an external controller to interrogate all the pickets and ask for the next gate that changed. Then, the system would be caused to broadcast the appropriate signal name and value from the picket to all other pickets, as originally stated, and repeat the cycle until no more signal changes occur or until the process is stopped.

Another process which could be developed to use our system would be a dictionary name search. In a dictionary name search names should be stored in picket memory 102 such that the first letter of all names can be compared with that of the desired broadcast name on broadcast data address bus 103. All pickets without a match are turned off with the control characteristic we provide. Then, the second letter is compared and the compare and turnoff procedure is repeated for successive letters (characters) until no active picket units remain or until the end of the word has been reached. At this point the remaining picket units are queried, and the index of the desired data is read out by the sequencer.

Figure 4:
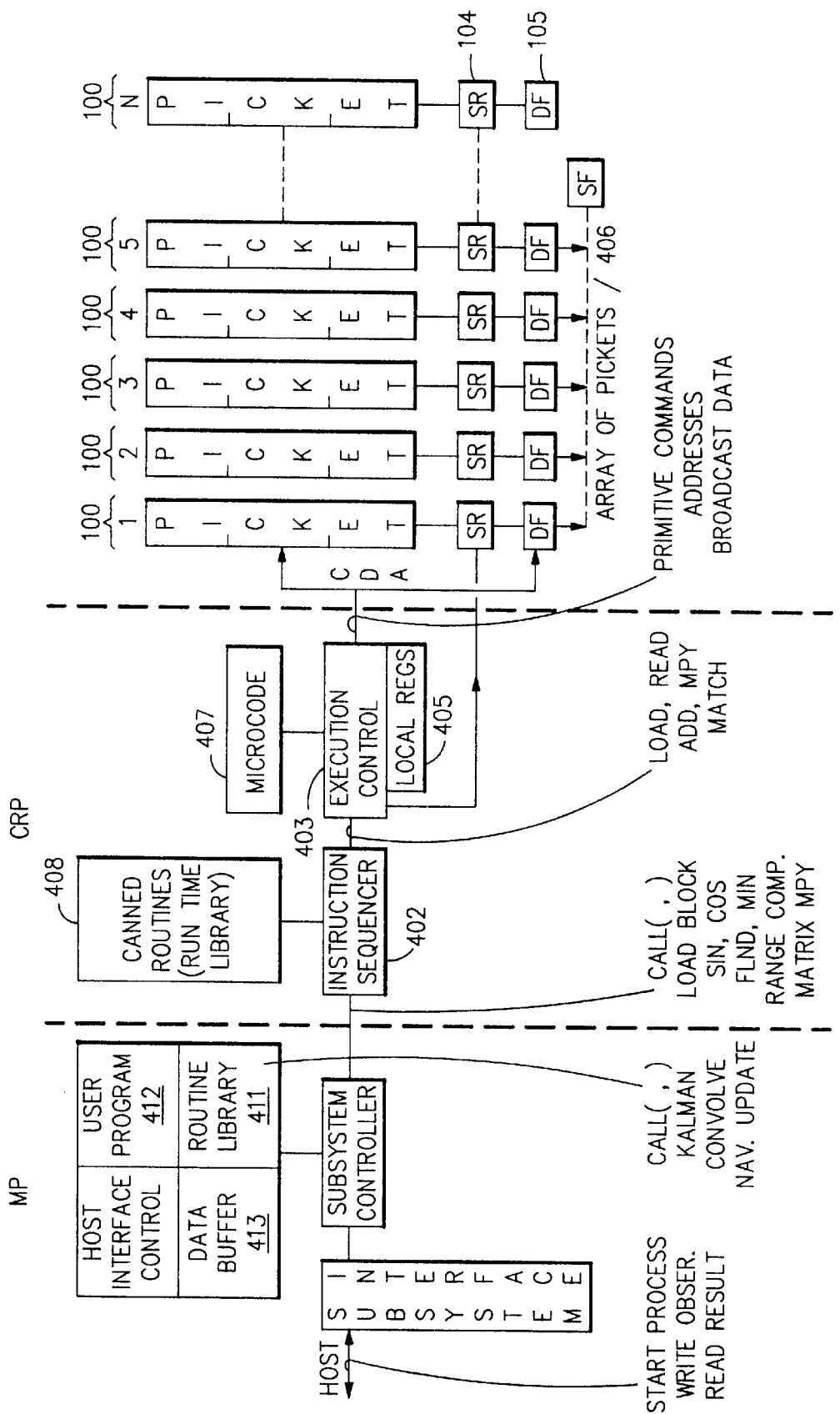
FIG. 4 illustrates a basic 16 (n) picket configuration for a SIMD sub-system which employs a microprocessor controller, a hardwired sequencing controller for canned routines, and a picket array. This basic parallel picket processor system may also be a standalone unit.

FIG. 4 illustrates a basic picket configuration of a plurality of parallel processors and memories, picket units, arranged in a row on a single silicon chip as part of a parallel array which may be configured as a SIMD sub-system, illustrating the control structure of such a system. Therein also is illustrated the control processor and the supervisory micro-processor. In FIG. 4, there is illustrated memory and parallel processing element logic on the same chip which within the FIG. 4 are shown in the section labeled Array of pickets. Each memory is n bits wide, preferably a character wide, 8 (9) bits, as we have said, but conceptually also having a word width of multiple bytes wide memory. Thus, the memory portion of the parallel picket processor element will be preferably 8 (9) bits wide, or alternatively, 16 or 32 bits wide. With current CMOS foundry technology, we prefer to use an 8 bit or character wide associative memory (9 bit wide byte with self checking) with each picket processing element. The memories are directly associated one-on-one with a coupled processing element which includes an ALU, mask registers (A & Q used for masking), and a latch 104 (SP in FIG. 4), as well as status registers 107 and data flow registers A 105 and Q 106 (DF in FIG. 4) which are illustrated in greater detail in the picket diagram of FIG. 2. The DRAM and logic of each picket processor do not have any burden of an interconnection network to contend with, for there is a direct one-on-one association between the multi-bit wide DRAM memory and its processing element on the chip itself.

It will be noted in FIG. 4 that the slide B register latch (SR) 104 is placed logically between the memory and the associated logic of the ALU of the processing element and that the latch becomes, in essence, a coupling port for each processing element along the picket array. Each picket chip comprises a plurality of parallel picket processing elements arranged in a line (which is illustrated as a straight bus) for communication with the picket control. A vector address bus is common to the memory, and a data vector address register controls what data passes across to each memory.

FIG. 4 also illustrates the interconnection between the main or micro-processor card (MP) which in our preferred embodiment is a 386 micro-processor configured as a PS/2 system with a subsystem controller through which global instructions pass to a canned-routine processor (CRP) which we have provided and which provides the instructions for an instruction sequencer 402 and execution control 403 which executes the specific micro-code called for by the instruction sequencer. This instruction sequencer might be analogized to a controller in function. However, also within the canned routine processor CRP we have provided local registers 405 which together with the local regs ALU (not shown) provide the basis for all addressing that is broadcast to all of the pickets within the picket array 406. In this way, address calculations are performed for all of the pickets in one ALU without using picket resources or conceivably without using picket execution cycles. This important addition adds control flexibility to the picket array, permitting doze, inhibit, and other control functions for specialized tasks to be performed and permitting pickets to be separated from any broadcast instruction or data function.

The instruction sequencer 402 with the loaded micro-code 407 broadcasts to the array of pickets for execution under the SIMD instruction sequence determined by the main program micro-processor MP and by the canned routines of the canned-routine processor CRP run time library 408 to enable SIMD processing of data contained in the array of pickets.

The instructions provided to the micro-processor MP via the subsystem interface are conceived to be high level process commands that might include Start Process, Write Obser. and Read Result which are passed to the micro-processor by the subsystem controller of the micro-processor MP. The micro-processor can be considered as the main system or control processor in the subsystem arrangement illustrated in FIGS. 4, 5, 6 and 7. It will be understood that this unit could also be a standalone unit with the addition of a peripheral input device (not shown) such as a keyboard and display unit. In this standalone configuration, the system MP could be considered to be a commercial PS/2 to which cards which include the sequencer card (which configures the canned-routine processor) and the processor array cards are inserted along the lines illustrated in FIG. 7. The routine library 411 can contain routine sequences for overall control of a process, such as CALL (,); Kalman, Convolve, and Nav. Update. The selection of these routines is via the user program, and thus the overall processing can be under the control of an external host or under control of the user program 412 located in the MP. A data buffer 413 is provided in MP memory for data transfers into and out of the parallel picket processor system. The instruction 402 sequencer is configured to execute the control stream from the MP as well as the canned-routines that reside in the canned-routine run time library memory 408.

Some of these routines include CALL (,), Load Block, Sin, Cos, Find, Min, Range Comp. and Matrix Multiply from canned-routines provided by the canned-routine runtime library 408.

Within the CRP is also micro-code 407 for the execution control of lower level functions like Load, Read, Add, Multiply, and Match functions.

We prefer and provide an external FOR/NEXT control for each processing unit. We also provide a deterministic floating-point byte normalize implementation.

The use of a deterministic approach to macro development for the system, which we have provided, permits picket grouping and GROUP control. A local doze function is provided to accommodate individual picket processing variations.

Should the user program require execution by the array of processors, primitive commands, addresses and broadcast data are provided to the array of picket processors.

The particular function which each part of the system utilizes is determined by the task to be performed and is assigned during compilation of the user program.

The flexibility of the subsystem may be illustrated by a rather common problem. Take, for example, a matrix multiplication problem . . . $|x|*|y|=|z|$.

This would be described as the problem of:

$$
R \begin{array}{cccc} & M & & \\ x1 & xR+1 & \ldots & \\ \cdot & \cdot & & \\ \cdot & \cdot & & \\ \cdot & \cdot & & \\ xR & x2R & \ldots & xRxM \end{array} \times M \begin{array}{cccc} & C & & \\ y1 & yM+1 & \ldots & \\ \cdot & \cdot & & \\ \cdot & \cdot & & \\ \cdot & \cdot & & \\ yM & y2M & \ldots & yMxC \end{array} = \begin{array}{cccc} & C & & \\ z1 & zR+1 & \ldots & \\ \cdot & \cdot & & \\ \cdot & \cdot & & \\ \cdot & \cdot & & \\ zR & z2R & \ldots & zR+C \end{array}
$$

Which would be solved by the following statements offered by way of example. Adjacent to each statement is illustrated the number of passes and number of clock cycles per pass.

|    |                                         | passes | cycles/pass |
|----|-----------------------------------------|--------|-------------|
| 01 | Call Matrix Mult Fx                     | 1      | c           |
|    | (R, M, C, Xaddr, Yaddr, Zaddr)          |        |             |
| 02 | xSUB = ySUB = zSUB = 1                  | 1      | 3           |
| 03 | DO I = 1 to C                           | 1      | 3           |
| 04 | DO J = 1 to R                           | C      | 3           |
| 05 | z = 0                                   | CxR    | 5/6*        |
| 06 | DO K = 1 to M                           | CxR    | 3           |
| 07 | *Assign to associative parallel processor* | | |
| 08 | Zz = Xx × Yy + Zz                       | CxRxM  | 204/345*    |
| 09 | *Return result*                     |        |             |
| 10 | xSUB = xSUB + R                         | CxRxM  | 2           |
| 11 | ySUB = ySUB + 1                         | CxRxM  | 2           |
| 12 | NEXT K                                  | CxRxM  | 3           |
| 13 | xSUB = xSUB − MxR + 1                   | CxR    | 2           |
| 14 | ySUB = ySUB − M                         | CxR    | 2           |
| 15 | zSUB = zSUB + 1                         | CxR    | 2           |
| 16 | NEXT J                                  | CxR    | 3           |
| 17 | xSUB = 1                                | C      | 2           |
| 18 | NEXT z                                  | C      | 3           |
| 19 | END Call                                | 1      | 1           |

Note * Fixed Point (4 byte)/Floating-Point (1+4 Byte) - see below.

From the above example, it will be seen that the task identified by the above statement 08 requires about 98% of the cycle time. Accordingly, it is assigned to the SIMD organization of the parallel picket processor. The other processes take only 2% of the cycle times and are maintained in the architecture within the micro-processor.

Accordingly, a review of this example of matrix multiplication would be assigned for execution (and each statement upon compilation would cause execution in a specific system location) to either the MP, the CRP, the local registers (LR), or to the picket array.

In the above example of matrix multiplication, the statement 01 would be assigned to the main processor MP, while statements 02, 05, 10, 11, 13, 14, 15, and 17 would be assigned to the local registers LR. Statements 03, 04, 06, 12, 16, 18, and 19 would be assigned for execution within the canned-routine processor CRP, with the otherwise time consuming matrix processing thus assigned for execution under the single instruction to the array of pickets and with assignment of the statement 08 to the array of pickets.

Figure 5:
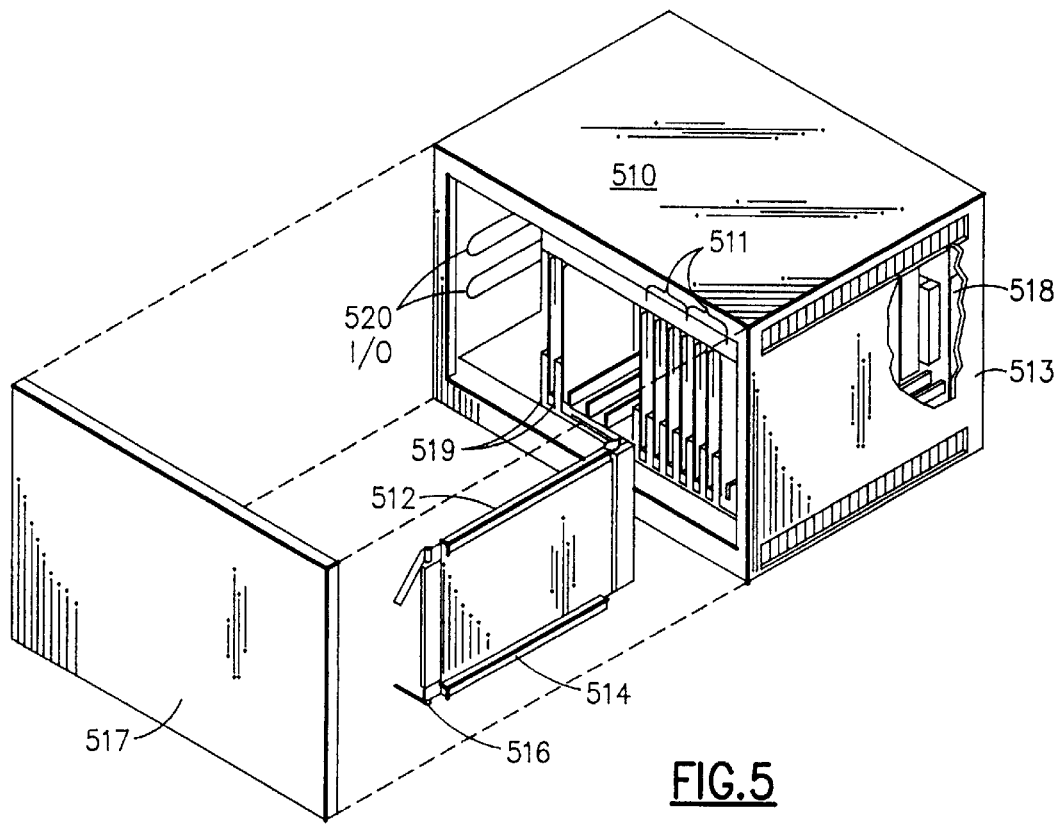
FIG. 5 illustrates a multiple picket processor system which incorporates a plurality of picket processors of FIG. 4.

FIG. 5 represents a multiple parallel picket processor system 510 which incorporates a plurality of parallel picket processors. For applications such as multiple target tracing, sensor and data fusion, signal processing, artificial intelligence, satellite image processing, pattern/target recognition, and Reed Solomon encode/decode operations, we have created a system which can be configured in a preferred embodiment as a SIMD system with 1024 parallel processors with two to 4 SEM E cards 511 (here represented as 4 cards per system) for each 1024 processors. The individual cards 512 are insertable in the rack-mount system compartment 513 with wedgelock slides 514, and the cards are provided with insertion/extraction levers 516 so that when the cover 517 is closed it effectively encloses a mountable system in a rack with 32 or 64M byte storage, with a performance capability of approximately 2 billion operations per second. The system is compact, and an array of a plurality of pickets is plugged into a backpanel board 518 which has logic and which allows interconnection of a plurality of cards.

The processor with 32M byte storage is formed on 4 SEM E cards, and the system weighs only about 30 pounds. Power is provided by power supplies 519 as illustrated. Power requirements for the air cooled processor of such power is estimated to be only about 280 watts. Each SIMD system has two I/O ports 520 for channel adapter communication to associated mainframes or otherwise to the rest of the world. With the illustrated multiple parallel picket processors each consisting of 4 logic pages and using standard modular avionics packaging and bus structure for attachment to an external memory (e.g. PI, TM and IEEE 488 buses), the processor may attach via the I/O port to the memory bus of a mission processor and may be viewed as an extension of a mission processor memory space.

With the illustrated multiple parallel picket processor comprising 1024 parallel processing elements, each processor has 32K bytes of local memory, and the associated path to the picket parallel processor is 8 bits or character wide (9 bit) parallel.

Processors within each picket exchange data with other neighbor processors and between pages via a backplane interconnection network, preferably a crossbar, but alternatively a Slide Crossbar, a Shuffle Network, a Base 3 N-Cube or a Base 8 N-Cube.

Figure 6:
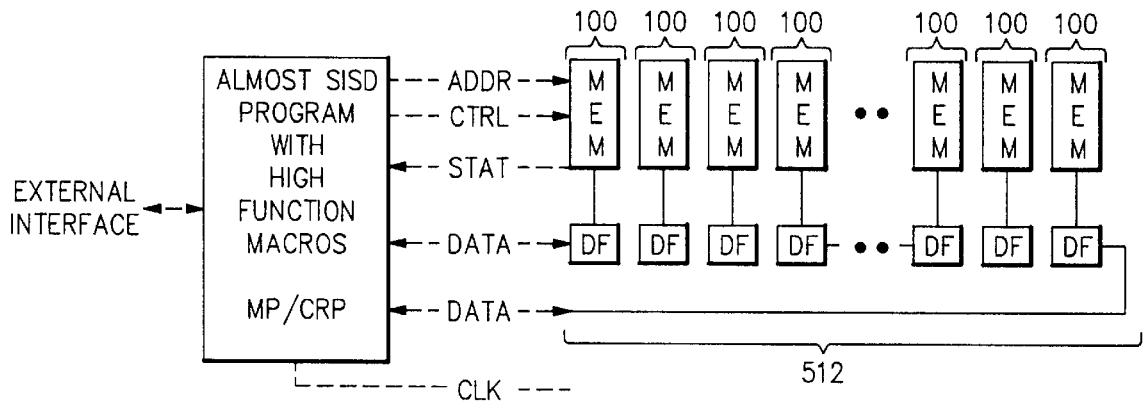
FIG. 6 is a subsystem functional block diagram.
Figure 7:
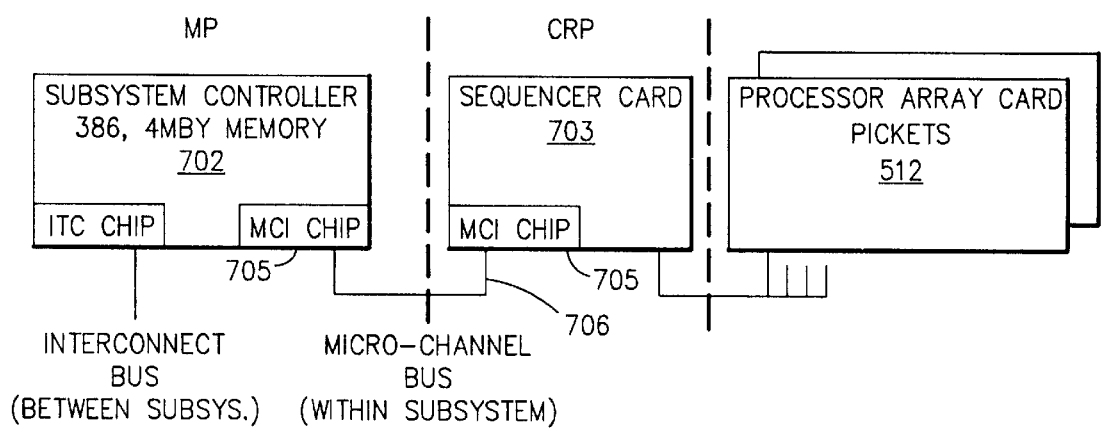
FIG. 7 further illustrates a subsystem controller's arrangement with the cards of FIG. 5.

Individual picket processors of the system are contained within a two card pack of the four cards, and the PS/2 micro-processor on one card, while the canned-routine processor sequencer is contained on the other of the four cards which comprise the system schematically illustrated in FIGS. 6 and 7. Individual pickets 100, or cards of pickets 512 can be configured on the fly with the canned routine processor CRP to enter or can drop out of operations based on data conditions as controlled by the latch 104 architecture and the local registers 405 which are coupled to the execution control of the sequencer card CRP 703. Thus, picket processors can independently perform the alignment and normalization operations which are associated with floating-point operations.

Processors are controlled in parallel by a common sequencer. The sequencer card 703 contains the controller CRP of the picket processor and may cause the picket process to execute a single thread of instructions, coded to execute on the array of SIMD processors in byte sequential fashion similar to classical bit-serial processing as well. The controller has three layers. Micro-control for the pickets is micro-coded similar to modern processors, and is transferred in parallel to all of the pickets. The Microcontrol and the pickets are synchronized to the same clock system CLK, so that the functions controlled by the sequencer can be executed in the same clock time. Feeding commands to the micro-control sequencer is the function of the canned-routine processor. This sequencer card 703 is a hardwired controller that during most functions executes loop control commands and recursively starts new micro-control sequences. This controller with its canned-routine library 408 and with its looping function keeps the pickets well fed, and not command bound. The canned-routine processor controller CRP contains a large collection of macros that are called by the main system, which in the subsystem acts as a primary supervisory picket controller. This is the top control system of the picket array. It is a 386 micro-processor that manages the activity of the array of pickets. At a given moment, all pickets of the array may execute the same instruction although subsets of processors may react individually to the control flow.

There are several variations of the individual reactions so that, by virtue of the control function for each picket (doze, inhibit, etc.) there is local autonomy of which programming may take advantage and which may be provided and put under control of the system during compilation of a program.

In addition, as has been described, there is local memory addressing autonomy. The SIMD controller sequencer supplies a common address for all of the pickets to use. Each picket can augment that address locally to enhance its ability to do data-dependent memory accesses.

In addition, a picket can participate or not participate in the array activities depending on local conditions.

With this characteristic, it is now possible to introduce the concepts of groups to SIMD processing, by providing a means for each picket to assign itself to one or more of several groups. Processing can proceed based on these groupings where a change of configuration can happen essentially on-the-fly. In one embodiment, only one group or combination of groups can be active at one time and each executes the same SIMD instruction stream. Some operations require working only with a subset or group of pickets. Programming can take advantage of this capability. Local participation autonomy is geared to work that way. Obviously, the more pickets that are computing, the better it is.

One way to increase the number of participating pickets is to allow each picket to execute its own instruction stream. This is essentially MIMD within SIMD. Now it is possible to essentially configure the same SIMD machine as a MIMD system or a machine of still a different configuration. This is because it is possible to program the picket to operate with its own sequence of instructions.

Because each picket can be made to have its own sequence, decoding a very simple set of instructions at the picket level is possible, and this allows more extensive local processing to take place. The areas where this function is most likely to find initial application is in complex decision making, however simple fixed point processing will be another area of interest to programmers.

A simple such program would load blocks of a picket program, say not to exceed 2K into picket memory 102. These can be executed when the SIMD controller card 703 initiates local execution through the execution control beginning at a specified xyz address. This would be continued as the controller either counts off so many clocks or tests for a task complete signal by monitoring the status funnel (SF) registers illustrated in FIG. 4.

The status funnel (SF FIG. 4) makes use of the latch 104 for each picket. Each picket has a latch 104 which can be loaded to reflect the status condition of the picket. The SIMD controller can test the collective value in these latches (one per picket) by monitoring an array status line. This array status line is the logical combination of the values from each of the picket status latches.

In the following example, assume that one would want to adjust a value that is bigger than 250 to be in the range 500<x<=250. The following routine would use the status funnel to detect that the task was accomplished.

```
If VALUE < 500 then TURN YOUR PICKET OFF
STAT ← PICKET OFF CONDITION
IF STAT FUNNEL = OFF then finished - - - -
VALUE ← VALUE – 250
Repeat
```

So, the multiple parallel picket processors configuration can be configured in various manners, and as a SIMD processor. Such a SIMD machine in the preferred embodiment is programmed to execute a single thread of instructions in the classical manner, and coded to execute on the array of SIMD processors in sequential fashion similar to classical processors, under general control of a SIMD controller or sequencer. At the application level this is accomplished by vector and vector like instructions, and vectors can be processed within processors and across processors. Vector instructions can be added with macroinstructions, typically with 6 to 10 such instructions.

With such a preferred embodiment, the system will appear schematically as illustrated in the functional block diagram of the parallel processor subsystem illustrated in FIG. 6. Through the I/O ports of the system as controlled by the host interface control 413, the subsystem sequencer functions similarly to a SIMD program with high function macros controlling the functions of the processing elements. Memory addressing enables an 8 bit, byte-wide, data flow, and modulo 8 arithmetic logic is used for functions (logical, add, multiply and divide). Provision is made for floating-point format and for autonomous picket operation with individual sleep and doze mode and separate addressing.

The subsystem controller's arrangement is illustrated in FIG. 7. Each of the processor array cards 512 (shown as 4 in this subsystem illustration, but capable of being reduced to 2 SEM E cards) are coupled to a sequencer CRP 703, which is coupled to a subsystem controller 702 which in turn is ported to either the main memory system or to another subsystem in the configuration via a chip 705 interface to the associated microchannel bus 706. In the preferred embodiment, the subsystem controller is a general purpose micro-processor unit of the IBM's PS/2 (a trademark of IBM) and employs an Intel 386 processing chip and 4M bytes memory. The personal computer micro-processor MP 702 is coupled to the sequencer's card via a microchannel type bus 705, 706 within the subsystem.

PREFERRED EMBODIMENT FOR LOCAL AUTONOMY FOR SIMD.

Figure 8:
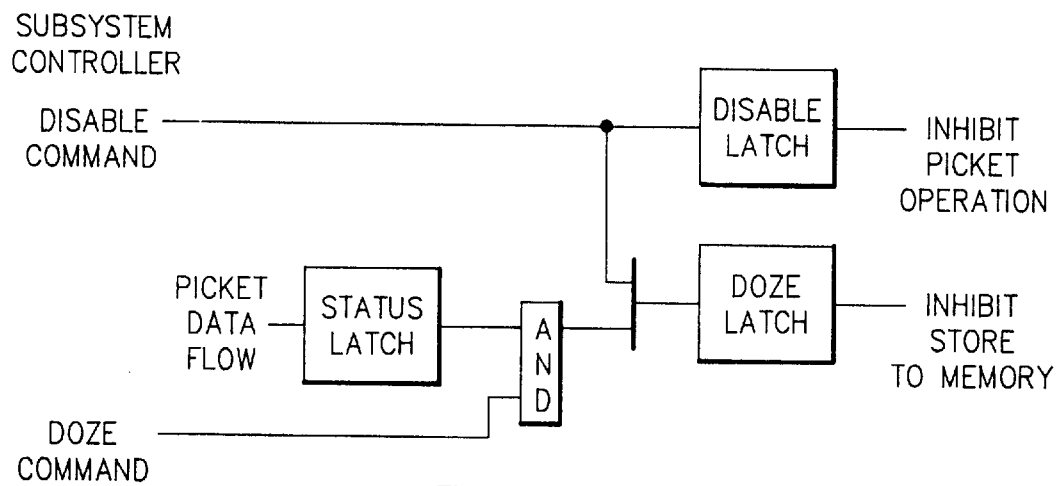
FIG. 8 illustrates the relationship of our defined DOZE and DISABLE instructions for the local autonomy of pickets in the SIMD machine in accordance with our preferred embodiment.

FIG. 8 shows how the array controller can disable a picket and how the picket can activate and deactivate itself to provide local autonomy in accordance with the preferred embodiment of our invention. Selective disabling of one or more pickets offers more freedom in problem execution that has been categorized here as local autonomy. The ability to issue SIMD commands to all pickets and to allow them to do different things depending on data within the picket can be extended in a few ways. One is to allow each picket to execute instructions in a mode we identify as SIMIMD. Another involves the dynamic grouping of pickets for segregated execution. Yet another allows floating-point adjust and normalize operations to be performed in the pickets efficiently.

By example, the selection of pickets is required to perform normal and simple tasks like ABSOLUTE VALUE where some of the pickets have data that is already positive and requires no change while other pickets have data that requires a complement operation. This task might be performed by complementing the value into a temporary location, while at the same time setting a mask with the sign of the result. The next instruction, then, could suspend activity in pickets that originally contained positive values. Then, the next instruction would move complemented (now positive) values from the temporary location to the original location. Now, all pickets contain positive values. It remains to reactivate the suspended pickets.

A local autonomy function that could apply is STORE per STAT (status) where the store operation only takes place when the STAT latch is set. In the above describer operation, this function would save two steps.

The suspend/reactivate approach encounters several problems in that:
1. machine efficiency is reduced by the effect of idle processors,
2. operations to set and reset the mask can be a significant part of a complex task and its program, and
3. with tasks like transferring data between processors, individual unit operations need to be quite varied as compared to simple run-stop masking.

Our preferred embodiment, which utilizes the structure described in connection with FIGS. 2–8, addresses local autonomy issues.

GENERAL DISCUSSION OF SIMIMD

We provide several implementation techniques that, when applied to the design of a picket in a SIMD array of pickets, result in operations that can be done easily where before the tasks would be difficult or impossible to perform. As a result each each picket has a degree of local autonomy.

These concepts extend the RUN/STOP choice that is described in prior art, such as those of U.S. Pat. Nos. 4,783,738 and 5,045,995. In our preferred system, each picket is enabled with a collection of or plural mechanisms which permit each picket to have a variety of execution capabilities to permit a variety of modes to be obtained for execution of data within a picket and enabling interpretation of SIMD commands within the picket as opposed to being sent from an external SIMD controller. This power extends to several modes where each processor of a SIMD array can and does perform a different operation based upon local conditions.

Several of these local autonomy functions can be combined to give the picket the ability to execute its own local program segment for short periods of time. This gives a MIMD capability within the SIMD array. This architecture that we call SIMIMD. Mechanisms that support SIMIMD make possible our SIMIMD array processing system.

Several of these functions participate in the mechanization of GROUPing of pickets to support the complex tools for selecting pickets into GROUPs for segregated computation. This function is called GROUPing, and the mechanisms that support GROUPing are included in our system, and GROUPing also is described in the related application entitled "Grouping of SIMD Pickets".

Several of these functions participate in the mechanization of an efficient floating-point approach that is discussed in the related application entitled "Floating-Point Implementation on a SIMD Machine". These mechanisms which support Floating-Point are preferred.

DISCUSSION OF SYSTEM MECHANISMS

The items of LOCAL AUTONOMY that we will discuss can be sorted into three categories:
1. Status Controlled Local Operations;
2. Data Controlled Local Operations; and
3. Processor to Microcontroller Status Distribution.

Discussion of Status Generation

STATUS is set based upon activity earlier in the instruction stream. Loading of the STATUS REGISTER is controlled by the instruction stream. It is loaded with the following instruction stream: Zero Detect, Sign, Equal, Greater Than, Less Than, and/or carry out.

Add with carry is a common use of a status function to extend the accuracy of arithmetic. More subtle uses of STATUS are included.

STATUS can be stored in memory as a data word for later use. STATUS can also be used in logical operations and arithmetic to generate rather complex combinations of other stored values. These computed values can be used to change the value of the picket's DOZE latch to cause a picket to suspend operations until it again can enable itself with other computed information.

Status can be saved as relates to subroutine call or context switching that is being executed within the array controller. A "pop" or "return" then can recall these values for use. Certainly a selected group or subset of pickets may participate in a subroutine operation, and a greater set of pickets would be activated upon return from the subroutine.

Status Controlled Local Operations

Each of the following "local autonomy" functions, when selected by a SIMD instruction from the SIMD subsystem controller, is controlled by STATUS. The status can be updated with a command to transfer one or all of the status conditions to the STATUS latch of FIG. 8, or this STATUS latch can be loaded from a memory location. This later method is used in picket grouping described in the application entitled "Grouping of SIMD Pickets". The STATUS of each of the local pickets can be grouped and collectively sent to the SIMD controller via the status funnel SF thereby giving the controller a clean way to react to picket activity without individually reading a stat (status) word from each picket.

Local Participation

A picket can turn itself on or off based upon prior status. A picket can put itself into DOZE mode by loading the FIG. 8 DOZE latch in the picket with the appropriate value. This might be called "local participation" autonomy, which provides a mechanism for internal control of individual pickets in a picket chip. A picket in DOZE mode does not change its state in that it does not write to its memory or change most register contents, but it does monitor all test operations and can turn itself back on again based on selected results. FIG. 8 shows the relationship of the two "off" modes, DOZE and DISABLE. DISABLE allows the subsystem controller to disable individual pickets that are not valid participators in the process. A disable instruction in a SIMD controller situation like U.S. Pat. No. 5,054,995 could act effectively to disable an individual processing element. However, here the controller would enable a selected picket when it needed to start another set of data in the process.

EXAMPLE . . . All pickets with value greater than zero do not participate in the next set of operations.

The relationship of DOZE and DISABLE in our preferred embodiment is illustrated in FIG. 8.

Carry-in per Status

In addition, in accordance with our invention, each picket can add a carry-in to the present operation based upon prior status. This is a common operation in a Von Neumann machine where the data length is a multiple of the hardware register length. But when many pickets are performing the same operation on different data, each picket must generate a carry-in based on the data in the previous operation. This is a unique operation for each picket and, hence, an important local autonomy operation.

EXAMPLE . . . Looking for leading zeros in floating-point normalize operations.

Inhibit Store per Status

Also, in accordance with our invention, a picket can inhibit a store operation to memory based upon prior status. This selective write operation allows a picket status to control the storing of data back into the picket's memory. It can be used as an effective inhibitor when a computation, which is executed in all pickets, does not create a result that is useful for some individual pickets.

EXAMPLE . . . Store back the complement if prior status was negative when computing the ABSOLUTE VALUE.

Register source Selection per Status

A picket can select one of two sources of data to load a hardware register based on status. The status is used to switch a multiplexer that is used to to select one of two data sources. The sources can be two hardware registers or a broadcast bus and one hardware register.

EXAMPLE . . . Read from broadcast bus if the data on it is useful to the picket; else, use the data in the internal register. This case might represent the dictionary function where a stream of letters and words are moving across the broadcast bus and only pickets that contain a potential match should capture the data.

EXAMPLE . . . Load Reg from a Register if content is smaller than the data that was read from memory.

Read from Alternate Memory Location per Status

A picket can read data from one of two memory locations based on Status (stride is 2\*\*n). There is typically more than one byte of data in a record. And, there is typically more than one data record per data set. This selection function allows the local picket status to choose between two records of data. Say we were looking for the largest and did a test to find the largest. Then, this function could be used to capture the selected record for future use.

EXAMPLE . . . In a floating-point adjust operation, two values are matched, one is scaled to make its exponent match the other one. Which "one" is determined by comparing the exponents and loading a Status Value.

Store to alternate Memory Location per Status

A picket can store data to one of two memory locations based on Status (stride is 2\*\*n). This one is similar to the read operation.

Select for Transfer to Neighbor per Status

A picket can transfer to the neighboring picket via our Slide operation. The source data for this operation can be either the A reg or the B reg per status. A good example is where a data is being compared across all pickets. The goal is to identify the largest. So all odd pickets move data to the right where it is stored in a register. The receiving picket will compare the new data word with the one the picket has, save status, and pass on the larger of the two by selecting the appropriate source.

Data Controlled Local Operations

There are several local autonomy functions that are based upon data within each picket. These data-dependent functions are enabled by micro-words from the SIMD controller that cause the contents of a data register to be used to determine independent activity within the picket. Several examples will describe the data controlled local operations.

Read from alternate Memory Location per data

Each picket can address its own memory using data contained in one of its registers as part of its memory address. The field of memory that can be addressed can range in powers of two from 2 up to all of a picket's memory. A good practical design point for today is 4k. Another feature introduces a stride into the addressing such that the controller can allow the picket to address every other word, or every fourth word, etc. The base (other bits of the picket address) fo this field of memory is supplied from the SIMD controller.

EXAMPLE . . . A prime application of these ideas applies to table lookup of one of a set of values such as trigonometric functions or transcendentals, where the value of SIN for angles from 0 to 90 degrees is contained in a table.

Conditional Indexing into a memory field

This idea combines two thoughts by conditioning the indexing with STATUS and determining the depth of the index based on data in a picket register.

Adder Operation based on data from Memory

The picket memory can contain "instructions" unique to the picket's task. These can be read out of memory, placed in a picket's register, and be executed by the picket dataflow registers, multiplexers, and ALU.

EXAMPLE . . . If the SIMD array were performing the simulation of a logic design, each picket could be assigned a logic function. If this is stored in a register, it can be used to command that function in the picket's ALU.

Mask Operation based on data from Memory

Each picket can achieve local autonomy by mixing data and masks in memory such that logic combinations of the data with masks can create different results in each picket. The pairing of data and its associated mask form a unit called a trit.

Picket to Micro-control Status Distribution

A third category of local autonomy relates to a picket determining its condition related to an event and reporting same to the SIMD Controller via the STATUS FUNNEL. The status funnel is essentially the collective logical OR of a condition from each active picket supplied to the controller. It indicates if at least one picket contains the requested condition. This idea can be repeated for other conditions such that the controller could be informed about maybe 4 or more conditions simultaneously. Thus, control decisions can be made based on independent tests made within the picket and communicated via STAT Reporting Funnel to the array controller.

EXAMPLE . . . This function can be used by the controller to determine if an operation is complete or there are no more active participants in an operation.

EXAMPLE . . . The picket array can perform a search through mask operation with all active pickets participating simultaneously and wherein matching pickets raise a match line indicating a match. The match condition is transmitted to the controller through the status funnel for subsequent decisions in the active process.

EXAMPLE . . . The picket array can hold a collection of information and look for a specific piece of information by comparing a character at a time and by turning off the pickets when they cease to produce a match. This creates a powerful parallel association function involving all of the active pickets in one simultaneous broadside compare.

Multi-level status and Status Saving

Two capabilities are described to manage the recursive generation and control of status. That is, as various levels of program are entered, status can become more complex and/or processor restrictive. The capability to save and restore complete picket status under software control permits cascading levels of software with CALL/RETURN sequences. Each of the pickets individually saves its status in memory when commanded by the array controller.

Generation of Status

Status is generated as a result of ALU operations. The instruction stream indicates both the condition to be tested and how the condition should be combined with existing Status. Choices include: ignoring test Result, Setting completely new status, and Or'ing or XOR'ing new status with existing status. Conditions that can be used to generate Status include: Zero result, Equal, Greater than, Less that, Not equal, Equal or greater than, Equal or less than, Overflow, and Underflow.

Instruction Controlled Use of Status

Each instruction provides commands to each picket as to how to collect Status and how to save it. Commands are provided to all pickets indicating how the status is to be used locally in the picket. These usage commands specify several things. These are all of the local autonomous ideas, including, picket participation, store-back inhibit, data source selection per status, and control of inter-picket communications among other functions. Commands are also provided that instruct the controller of the array of pickets just how the status from the individual pickets is to be collected at the controller and how it is to be used by the controller to manage global operations. Essentially, the status from each picket is ORed or ANDed with the status from every other picket, and the result is presented to the array controller for its use.

SIMIMD DISCUSSION OF PREFERRED EMBODIMENT

With the capabilities of SIMIMD, a SIMD controller, such as the array controller 14 of FIG. 1, or the subsystem controller of our preferred embodiment illustrated in FIG. 4, where processing elements or pickets are configured for a SIMD array process, issues the same instruction to all pickets in the array. Each picket interprets the instruction and executes it. The concept here is to allow that some instructions can be interpreted differently in each picket. These small variations give each picket a degree of local autonomy. Our several local autonomy functions provide functions used by SIMIMD mode processes.

Figure 9:
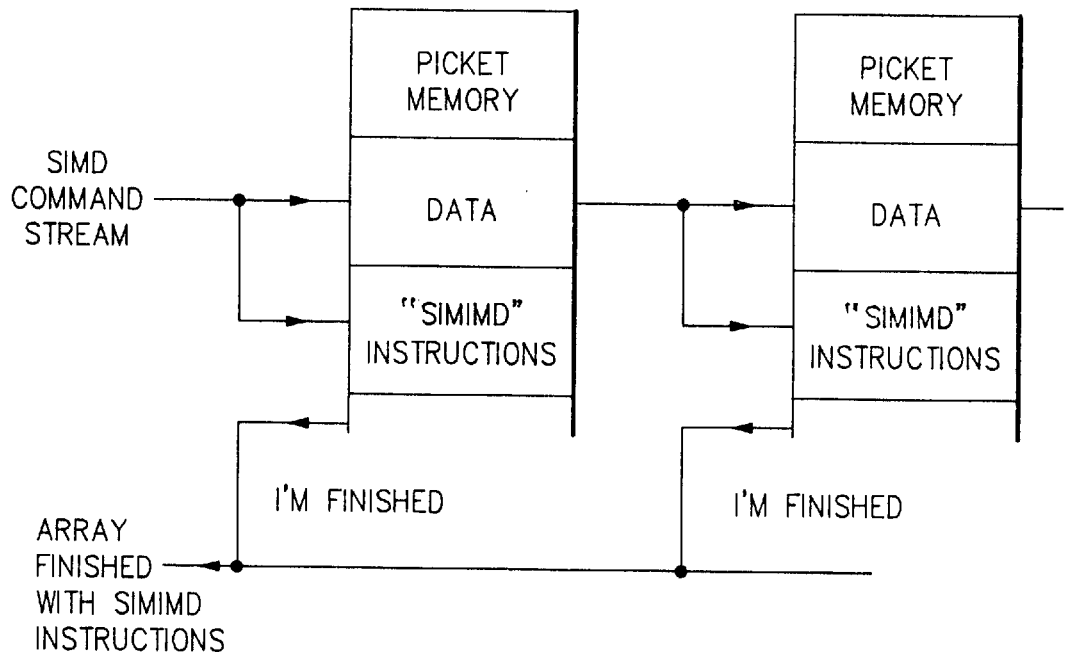
FIG. 9 illustrates a SIMIMD processor mode in accordance with the preferred embodiment of our invention.

FIG. 9 shows how SIMD commands can be used to cause each processing element in the array to execute its own instructions. When a HANG occurs, each picket indicates that it is finished with SIMIMD mode operations. Here, we discuss implementing those local variations of the appropriate type so that each picket becomes capable of executing instructions out of its own memory. The idea is that the SIMD controller issues instructions to the pickets telling them to go through the process of looking up the instruction address, finding the instruction, reading the instruction out of the picket's memory, executing it, saving the result, and then getting more. The SIMD controller issues commands for each of these steps for each "MIMD" command.

At some point, the SIMD controller finishes the string of MIMD operations and returns to conventional SIMD operations. The result of this little excursion into MIMD land is stored in the memory of each picket. Some refer to this as excursion as operation in SIMIMD mode.

The diagram in FIG. 9 shows this pictorially. SIMD instructions generally work on data in all of the pickets in parallel. With our preferred embodiment, the same SIMD instruction stream is used to execute instructions stored within each picket. Because each picket can now be executing a different local instruction stream, each can now be doing something different. Also, each picket may be done with its program at different times. Provision is included such that each picket program indicates when it is finished, and the SIMD controller thus continues with commands to execute SIMIMD instructions in each picket until all pickets have completed or until the controller decides to stop the SIMIMD operations.

The instruction set that is implemented in the pickets in SIMIMD mode must be very simple so that it requires little of the very precious on-chip hardware. While other systems have become more complex, one of the advantages of the present preferred system is that for such a system such as was common 20 years ago, an accumulator architecture can be employed for its attendant simplicity. For this description, we consider the following simple instruction set. The instructions are shown in three categories to match the necessary SIMD control sequence that executes them.

ADD, SUB, AND, OR, XOR, NEG, NOP

STORE

BRANCH ON CONDITION (sign, zero, carry, unconditional)

The SIMD sequence to cause MIMD operations within the pickets is quite dependent on the width of the memory.

Byte-wide memory will require two accesses for a 16 bit word while a 16 bit wide memory requires one access. The instruction sequences shown below assume that the dataflow is such that each operation is completed in one cycle. Following is a SIMD command string that causes MIMD execution in the pickets. One SIMD sequence is sent to all processors in the array, and the interpretation of the SIMIMD opcode in each picket causes one of the three sequences shown in steps 5–7.

MOST INSTRUCTIONS—Add,Sub,And,Or,Xor,Neg, Nop
1) MADR<-IADR
2) IADR<-IADR+1
3) memory read
4) OPREG<-MDATA
5) MADR<-Operand Address
6) memory read
7) A-REG<-A-REG (op) MDATA RELATIVE BRANCH
1) MADR<-IADR
2) IADR<+IADR+1
3) memory read
4) OPREG<-MDATA
5) MADR<-Operand Address (no function)
6) memory Nop (no function)
7) IADR<-IADR (op) MDATA STORE
1) MADR<-IADR
2) IADR<-IADR+1
3) memory read
4) OPREG<-MDATA
5) MADR<-Operand Address, MDATA<-A-Reg
6) memory Store
7) A-REG<-A-REG (op) MDATA (no function)

Notice that all instructions must have the same number of SIMD cycles and that the commands in the same cycle are very similar. Steps 1,2,3,4 are identical in all three forms, and cause the Instruction Fetch and Decode portion of the SIMIMD instructions.

Steps 5, 6, and 7 form the Execution portion of the instructions and have some functions that are dependent on the op code in the picket OPREG that was loaded from memory in step 4. In most instructions, steps 5,6 read out the operand, and step 7 performs the operation and stores the result in the accumulator.

For the STORE instruction, step 5 moves the data to the memory data reg, step 6 is a memory store operation, and step 7 serves no function except to maintain 7 cycles.

In the BRANCH instruction, steps 5,6 serve no function, and step 7 adds the offset from the operation code to the instruction reg. Alternatively, step 7 would do nothing if the branch condition was not met. This instruction, when coded such that the condition is never met, becomes a NOP. And, when coded as an unconditional branch to itself, it becomes a HANG at the end of a routine.

Now there are hardware implemented features required to support these features of local autonomy that allow SIMIMD execution, including:

locally loaded address register in each picket, and
locally loaded operation register in each picket.

Normally, a picket address is supplied to all pickets simultaneously from the controller. When in SIMIMD mode, each picket can load the address register from its data flow.

Operations within the picket normally come as micro-orders from the array controller. When in SIMIMD mode, some of these micro-orders can come from an operation register within each picket. Thus, the ALU and some register clocks can be controlled from data that is read from each picket's memory and stored in each picket's operation register.

Hardware implemented local autonomy features needed to support instructions within the pickets are based on operation register directed functions.

In cycle 5, in addition to loading MADR with the operand address, if the opcode is a STORE, then MDATA<-A one.

| MOST INSTR | MADR ← Operand Address |
|---|---|
| BRANCH | MADR ← Operand Address (not used) |
| STORE | MADR ← Operand Address, MDATA ← A-Reg |

In cycle 6, Memory operation is READ, STORE, NOP as a function of the OP reg contents.

| MOST INSTR | memory read |
|---|---|
| BRANCH | no memory operation |
| STORE | memory store |

In cycle 7, the Register clocks are a function of the Op Reg contents.

| MOST INSTR | Destination is the Areg |
|---|---|
| BRANCH | Destination is IADR (do not clock Areg) |
| STORE | No Destination (do not clock Areg) |

In cycle 7, the ALU operation is a function of the Op Reg contents.

| MOST INSTR | Function of operation reg (ADD yields add, etc.) |
|---|---|
| BRANCH | add if condition met, IADR ← IADR if condition not met |
| STORE | does nothing |

There can be more elaborate implementations made to the illustrated SIMIMD mode, but what is presented here discloses the essential principles of our SIMIMD mode embodiment.

GENERAL DISCUSSION OF PREFERRED FLOATING-POINT EMBODIMENT

It is especially desirable to have local autonomy in a SIMD machine for applications of floating-point arithmetic calculations. The application can be appreciated by inclusion of a description of the new way of providing floating-point capability for a SIMD array machine which has been elaborated in the above referenced co-pending application entitled "Floating-Point for SIMD Array Machine."

Figure 11:
Figure 11:
Figure 11:
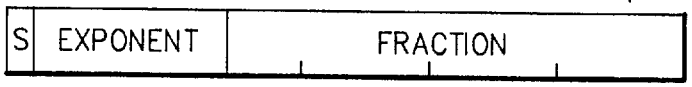
Figure 11:
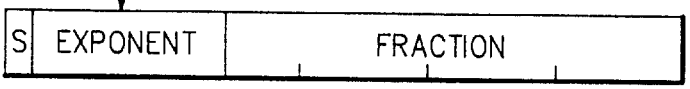
Figure 12:
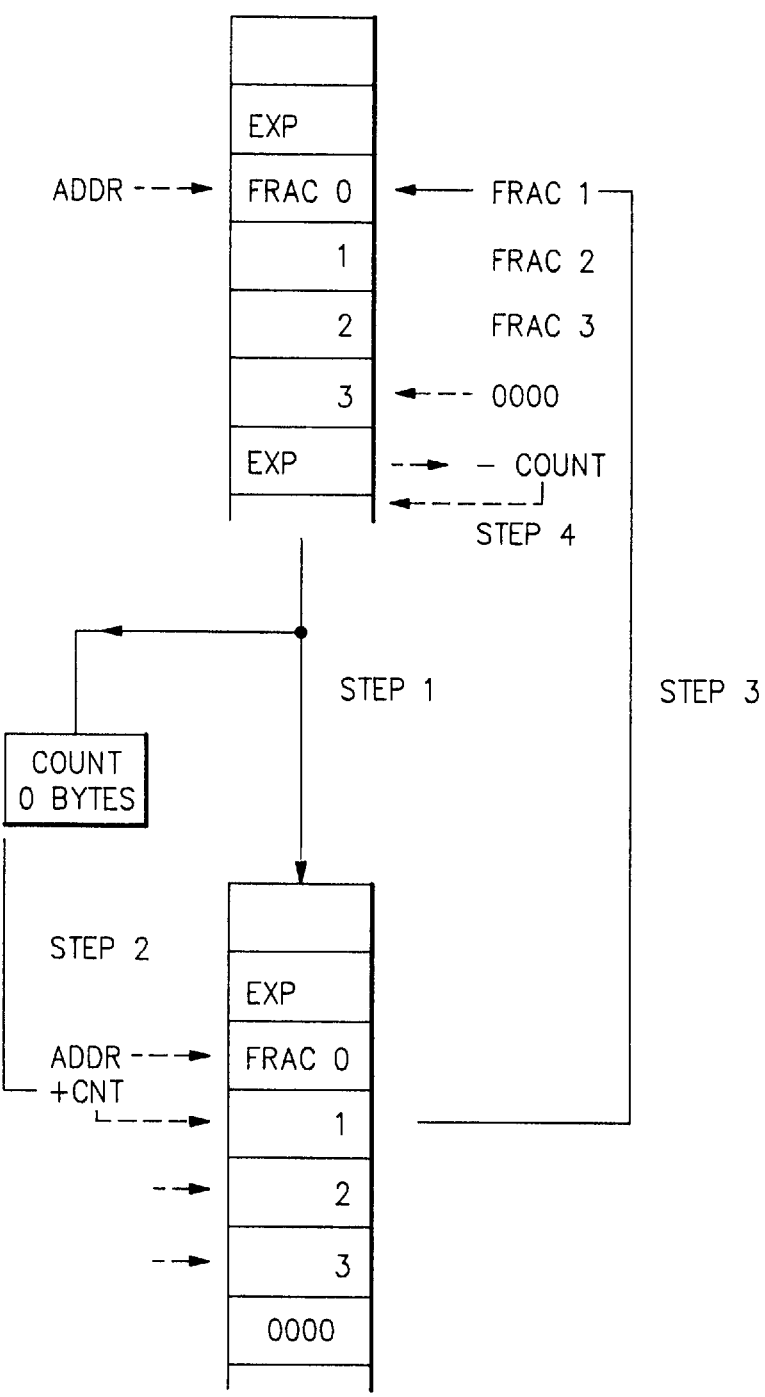
FIG. 12 shows how to use memory to do adjust shifts in accordance with our invention.

A floating-point format for the above system will allow array SIMD machines to execute floating-point arithmetic operations. For convenience of illustration we have described the floating-point format in FIG. 10, which shows our floating-point format. The fraction count shifts one byte for an exponent count of 1. FIG. 11 illustrates the steps to do floating-point adjust by a byte shift of the fraction and the increment of 1 of the floating-point exponent. The particular arrangement permits the use of memory to do adjust shifts. FIG. 12 illustrates the use of adjust shifts by using the byte-wide memory to advantage to perform the shifts that are part of the floating-point adjust operation.

FLOATING-POINT FORMAT

Figure 10:
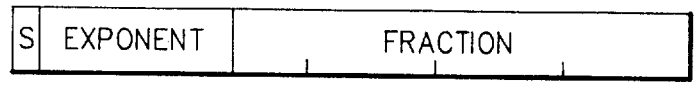
FIG. 10 illustrates the specific floating-point format of the preferred embodiment of our invention.

A key to the successful implementation for floating-point in a SIMD machine is the right format as illustrated in FIG. 10. The correct format implies that the format is compatible with some aspect of the architecture and not necessarily with one of the existing floating-point standards.

We provide a format that executes on a byte-wide dataflow with several times the performance of a conventional implementation.

The format generates an answer that is at least as accurate as the IEEE 32 bit floating-point standard. It is about 2 bits more accurate on the average.

The format can easily be converted to/from an existing standard for the user's consumption.

Therefore, the "outside" world can see a standard it recognizes. We can efficiently execute the floating-point in this suggested format internal to the pickets and translate the data between formats as needed when data is loaded or removed from the parallel processor.

The floating-point format was chosen to gain implementation efficiency on the multi-byte-wide data flow. The format yields implementation efficiencies while providing computational accuracy in excess of the IEEE 32 bit floating-point format.

The format illustrated in FIG. 10 is representative of a format suitable for the accuracy greater than the IEEE 32 bit floating-point format and is intended to be implemented in machines having byte-wide (8 bit) data streams. The preferred format consists of a sign bit, 7 exponent bits and 4 fraction bytes of eight bits for a total of 40 bits.

Note that the same computational style can be extended to obtain floating-point computation with more accuracy by extending the fraction an integral number of bytes in length.

Each count of the exponent represents an 8 bit shift of the fraction, so a normalized number can have up to 7 leading zeros. If there are 8 or more leading zeros, then the number needs an adjustment to normalize it.

FIG. 11 illustrates using adjust shift to do the floating-point adjust. In the system, the data word is made up with the format of FIG. 10. The floating-point adjustment consists of shifting the fraction 8 bits to the left, and reducing the exponent by 1. In a byte-wide data flow typified by the above described system, this shifting can be accomplished by simply taking the next byte as the first, and dropping the first byte of all zeros. Implementation of this shift can be done in different ways.

In a byte wide dataflow, shift the data in one byte-wide shift in one clock cycle. Up to three shifts are required. This can be combined with the leading zeros testing.

Another approach illustrated in FIG. 12 can be implemented for parallel arrays, and this approach is especially advantageous in those machines where the processing element of the array has its own memory. We here assume the data resides in memory. The machine will first determine the number of bytes of leading zeros. Then, the machine will use the count of leading zero bytes to adjust the fetch address used to get the data. The normalize process can then be accomplished in four clocks as part of a data move operation.

It is desirable, in a SIMD machine, to make all operations execute in a fixed pre-determined number of cycles. with conventional floating-point, where one count in the exponent represents one fraction bit, the shift and count process takes place once for each leading zero in the fraction. There would be from 0 to 32 cycles to perform normalize. Each picket would be executing the correct number of cycles for the fraction in its hardware and that number is different for other pickets. To make this process deterministic, the entire SIMD machine must execute the maximum number of cycles (32), with a lot of idle time in many pickets.

The idea described here has been made deterministic, and is executed in 12 cycles as follows:

1. Move the fraction from memory to a register (in memory) a byte at a time starting with the most significant end, and note if each byte contains all zeros. If so, count the number of bytes that do.
   This operation takes 4 cycles.
2. Assume a pointer which contains the "address" of the most significant byte of the fraction. Add the count of zero bytes (0–4) to this pointer so that it points to the most significant non-zero byte of the fraction.
   This operation takes 1 cycle.
3. Store the fraction back into memory using the pointer to start with the most significant non-zero byte and padding the least significant end with bytes containing zeros.
   This operation takes 4 cycles.
4. Now decrement the exponent by the count and store it back into memory
   This operation takes 3 cycles.

This operation is shown both pictorially, and as implemented in a picket in the described drawings.

To accomplish the above approach to normalize, several features of the picket design require a degree of local autonomy. Some of these are described in the the application entitled "Picket Autonomy on a SIMD Machine" referenced above. The features providing limited PME or picket autonomy include:

Test for zero and put in status; and increment counter if status is set; and provide data-dependent access to memory using pointer value in register as the memory index.

While we have described our preferred embodiments of our invention, it will be understood that those skilled in the art, both now and in the future, may make make various improvements and enhancements which fall within the scope of the claims which follow. These claims should be construed to maintain the proper protection for the invention first disclosed.

We claim:

1. An array processing system, comprising:

data processing means including an array controller, a plurality of array processor elements each having a dedicated local memory, and means for execution within a plurality of said array processing elements for execution of instructions under cycle by cycle control of said array controller in a SIMIMD mode, each array processing element having a locally loaded address register and a locally loaded operation register, and wherein execution of multiple independent instruction sequences on multiple independent data streams located one per array processor element is controlled by a SIND instruction stream;

wherein the array processing system provides a multi-processor memory system including a PME architecture multi-processor memory element on a single semiconductor substrate which functions as a system node, said multi-processor memory element including said plurality of processing memory elements, and means on said substrate for distributing interconnection and controls within the multi-processor memory system node enabling the system to perform SIMD/MIMD functions as a multi-processor memory system, wherein each dedicated local memory is independently accessible by the respectively coupled processor in both SIND and MIND modes exclusive of access by another processor.

2. An array processor according to claim 1 wherein every processor element in the plurality of array processor elements is a picket including a processor and local memory enabled for receiving and executing a command from the array controller on each clock cycle, some of which commands can be interpreted within each picket to create different operations.

3. An array processor according to claim 2 wherein said pickets provide unique functions within the processing elements which enable said processing elements to implement MIMD execution instructions.

4. An array processor according to claim 3 wherein said execution instructions include: ADD, SUB, AND, OR, XOR, NEG, NOP, STORE, and BRANCH ON CONDITION (sign, zero, carry, unconditional).

5. An array processor according to claim 3 wherein the processing elements in SIMIMD mode of instruction execution perform the functions:
Get Instruction Address
Instruction Fetch
Operation Decode
Instruction pointer update
Data Fetch
Instruction Execution
Storing of result.

6. An array processor according to claim 3 wherein each picket includes an address register which can be loaded from said array controller and from data within picket dataflow under control of a SIMD command from said array controller.

7. An array processor according to claim 3 where each picket is provided with a picket operation register, said picket operation register being used in SIMIMD mode to provide alternative picket dataflow.

8. An array processor according to claim 7 wherein each picket includes an arithmetic logic unit (ALU) and a picket operation register and the operation of a picket ALU is determined from the picket operation register as directed by said array controller.

9. An array processor according to claim 7 wherein an address of a picket destination register is determined from a picket operation register under direction of said array controller and when so directed by said array controller.

10. An array processor comprising: an array of processors for execution of data in parallel with other processors of said array of processors, all processors of the array each respectively having data stream and coupled and dedicated local memory elements integrated as processing elements of the array, each processor of the array having a locally loaded address register and a locally loaded operation register, and wherein in the array all processors can be commanded from a single instruction stream to execute multiple independent instruction sequences on multiple independent data streams located one per processing element;
wherein the array processor provides a multi-processor memory system including a PME architecture multi-processor memory element on a single semiconductor substrate which functions as a system node, said multi-processor memory element including said plurality of processing memory elements, and means on said substrate for distributing interconnection and controls within the multi-processor memory system node enabling the system to perform SIMD/MIMD functions as a multi-processor memory system, wherein each of the coupled and dedicated local memory elements is independently accessible by the respectively coupled processor in both SIMD and MIMD modes exclusive of access by another processor.

11. An array processor according to claim 10 wherein each of said processing elements of an array comprise a picket including a processor and local memory, and individual pickets execute data-dependent operations within the picket as controlled by a SIMD instruction stream.

12. An array processor according to claim 10 wherein each of said array processors is coupled by an array controller to function as a SIMD machine provided with the ability to sequence multiple instruction steams, one per picket of an addressed array of pickets wherein each picket includes a processor and local memory, using a SIMD instruction stream to operate on multiple data streams.

13. An array processor according to claim 12 wherein said pickets provide unique functions within the processing elements which enable said processing elements to implement MIMD execution instructions.

14. An array processor according to claim 13 wherein said execution instructions include: ADD, SUB, AND, OR, XOR, NEG, NOP, STORE, and BRANCH ON CONDITION (sign, zero, carry, unconditional).

15. An array processor according to claim 13 wherein the processing elements in SIMIMD mode of instruction execution perform the functions:
Get Instruction Address
Instruction Fetch
Operation Decode
Instruction pointer update
Data Fetch
Instruction Execution
Storing of result.

16. An array processor according to claim 13 wherein each picket includes an address register which can be loaded from said array controller and from data within picket dataflow under control of a SIMD command from said array controller.

17. An array processor according to claim 13 where each picket is provided with a picket operation register, said picket operation register being used in SIMIMD mode wherein data dependent operations within each picket are controlled by a SIMD instruction stream to provide alternative picket dataflow control.

18. An array processor according to claim 17 wherein each picket includes an arithmetic logic unit (ALU) and a picket operation register and the operation of a picket ALU is determined form the picket operation register as directed by said array controller.

19. An array processor according to claim 17 wherein an address of a picket destination register is determined from a picket operation register under direction of said array controller and when so directed by said array controller.

20. An array processor according to claim 17 wherein a picket is for processing SIMD with an array of processors and a plurality of array processing elements which are coupled for intercommunication of data and instructions as pickets are provided with plural mechanisms which permit each picket to have a variety of execution capabilities to permit a variety of modes to be obtained for execution of data within a picket and enabling interpretation of SIMD commands within the picket.

21. An array processor according to claim 20 wherein each picket has said plural mechanisms enabling it to operate in several modes where each processor of a SIMD array can and does perform a different operation based upon local conditions.

22. An array processor according to claim 20 wherein, in a SIMIMD array processor mode, at least one of a plurality of array processors operates in SIMIMD mode receiving and executing a command from a controller on each clock cycle, some of which commands are interpreted within each picket to create different operations.

23. An array processor according to claim 20 wherein an interpretation of a SIMD command within each picket can be controlled by one or several status latches or register bits within each picket.

24. An array processor according to claim 20 wherein a SIMD command within each picket can be controlled by data in a register or registers within the picket.

25. An array processor according to claim 20 wherein status conditions resulting from picket operations can be collected and directed to a controller of the array of processors.

26. An array processor according to claim 20 wherein a picket further includes a DOZE latch and when said DOZE latch is loaded with an appropriate value the picket can continue to read memory, do arithmetic, and to store into said DOZE latch but the picket does not write to memory.

27. An array processor according to claim 20 wherein floating-point calculations can be processed by an array of pickets for processing a range of possible floating-point numbers, and wherein the floating-point processing array includes a plurality of picket units, each picket unit having a bit parallel processing element combined with a local memory coupled to the processing element for the parallel processing of information in all picket units in such a way that each picket unit is adapted to perform one element of a process which utilizes memory.

28. An array processor according to claim 20 wherein a plurality of picket units arranged in an array have their memory arranged as a set associative memory.

29. An array processor according to claim 20 wherein said array processor is configurable as a SIMD and SIMIMD system, and groups of said plurality of array processing elements are assigned to a programmable configuration in which individual elements of the system have a degree of local autonomy.

30. An array processor according to claim 20 wherein a plurality of array processing elements have a local autonomy and test for zeros and put in status; and increment a counter if status is set; and provide data-dependent access to memory using a pointer value in a register of said array processor as a memory index.

* * * * *